United States Patent [19]
Bright

[11] Patent Number: 5,319,007
[45] Date of Patent: Jun. 7, 1994

[54] OPTICAL PLASTICS AND METHODS FOR MAKING THE SAME

[76] Inventor: Elvin M. Bright, 17242 Bircher St., Granada Hills, Calif. 91344

[21] Appl. No.: 818,485

[22] Filed: Jan. 7, 1992

Related U.S. Application Data

[63] Continuation of Ser. No. 426,987, Oct. 25, 1989, abandoned, which is a continuation-in-part of Ser. No. 269,457, Nov. 9, 1988, abandoned.

[51] Int. Cl.$^5$ .................... C08L 67/06; G02C 7/02
[52] U.S. Cl. ..................... 523/516; 523/500; 525/27; 525/39; 525/48; 351/159
[58] Field of Search ............... 525/39, 48, 27; 523/500, 516; 351/159

[56] References Cited

U.S. PATENT DOCUMENTS

| | | | |
|---|---|---|---|
| 4,139,578 | 2/1979 | Baughman | 525/39 |
| 4,139,578 | 2/1979 | Baughman et al. | 525/169 |
| 4,178,327 | 12/1979 | Hall | 525/169 |

FOREIGN PATENT DOCUMENTS

| | | |
|---|---|---|
| 0008216 | 2/1980 | European Pat. Off. |
| 0096196 | 12/1983 | European Pat. Off. |
| 0234692 | 9/1987 | European Pat. Off. |
| 2032938 | 5/1980 | United Kingdom |

OTHER PUBLICATIONS

*Patent Abstracts of Japan,* vol. 8, No. 241 (C-250)[1678], Nov. 6, 1984 & JP-A-59 122 514, (Hitachi Kasei Kogyo K.K.), Jul. 16, 1984.

*Patent Abstracts of Japan,* vol. 6, No. 266 (C-142)[1144], Dec. 25, 1982; and JP-A-57 158 216, (Nippon Denshin Denwa Kosha), Sep. 30, 1982.

*Primary Examiner*—Patricia A. Short

[57] ABSTRACT

Ophthalmic lens compositions comprising a cured polymer mixture of (A) an unsaturated polyester resin composition, (B) a monomer of the formula

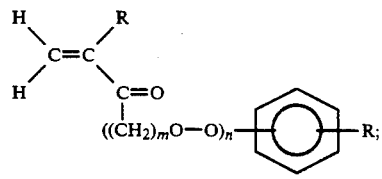

(C) an optional vinyl, acrylate monomer, or other monomer or mixtures thereof, and (D) a free radical generating catalyst system. Such a curable plastic material can form ophthalmic lenses of superior properties including high index of refraction which reduces the amount of material required for corrections.

20 Claims, 7 Drawing Sheets

FIG. 2
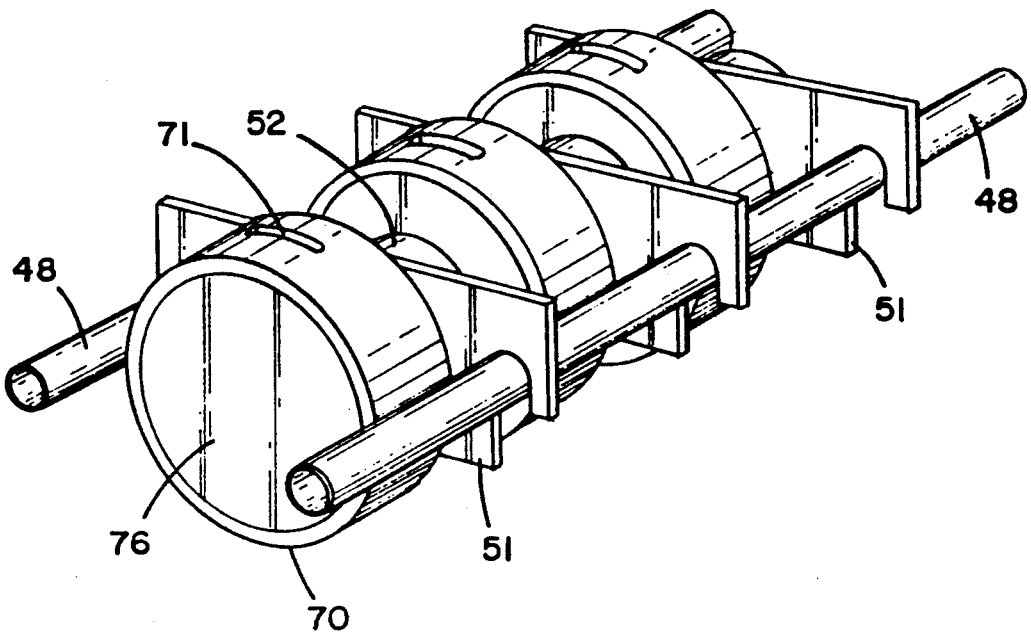
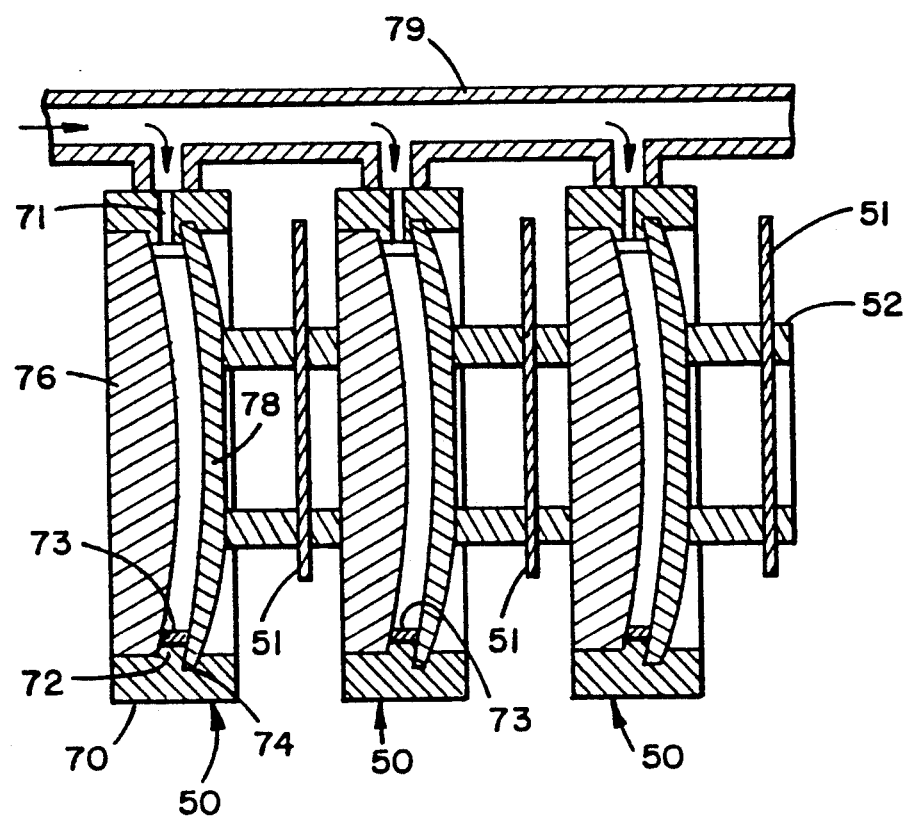
FIG. 3

FIG. 7

- AIR PRESSURE SOURCE —120
- AIR PRESSURE CONTROL —122
- HOT WATER
- INCLINED FILLING POSITION
- 102, 94, 124, 80, 98, 96, 107, 113, 88, 82, 89, 104, 106, 90, 126
- CATALYZED RESIN
- FLOW CONTROL —114
- HOT WATER SOURCE —112

FIG. 8

- 94
- BLADDER
- 118
- 124
- ALUMINUM PLATE
- 86
- 89, 88, 106, 90, 82, 104

OPTICAL PLASTICS AND METHODS FOR MAKING THE SAME

CROSS REFERENCE TO RELATED APPLICATION

This is a continuation, of application Ser. No. 07/426,987, filed Oct. 25, 1989, which was abandoned upon the filing hereof, which is a cotninuation-in-part applicaiton of Ser. No. 269,457, filed Nov. 9, 1988, now abandoned, of the present inventor.

FIELD OF THE INVENTION

The invention relates to optical plastics and more particularly to compositions, methods and products for plastic ophthalmic lenses and other optical devices having excellent optical properties, surface hardness, strength, impact resistance, and compatibility to coatings.

BACKGROUND OF THE INVENTION

Many eyeglass lenses and other optical products are now being made of synthetic resins because of cost, weight, strength and processing considerations. When they can be molded with suitably precise curvatures and high purity, optical plastics can be employed wherever temperature sensitivity, index of refraction, and dispersion characteristics are not too limiting. The most used resins for these purposes are polycarbonates, which can be molded or cast by production equipment into finished or semi-finished form at relatively lower cost than glass, despite the much longer history of glass technology. Plastics have excellent impact resistance, and although they are less abrasion resistant than glass, hard thin coatings are now available that can overcome this deficiency.

Special requirements must be met in casting eyeglass lenses from synthetic resins. The requirements are quite severe and have resulted in domination of the plastic eyeglass market by one particular formulation. The cast and finished product must not only be clear and without noticeable coloration, but must be free of impurities, bubbles and striations. The materials should not attack or be incompatible with the molds and gaskets used in the casting process. They should have relatively low sensitivity to process conditions, with the consequent low yields that such criticality usually causes.

In most instances, the eyeglass blank is cast in thick semi-finished form, with its convex (outer) surface having a specified curvature. The inner (concave) side is then ground and polished down to the desired final lens thickness and the needed curvature for a given optical prescription. Consequently, the material must abrade in such manner that it does not adhere to or clog the finishing surface or abrasive material and slow the finishing operation. Currently, five steps are used in forming and finishing a contour and if this procedure can be shortened, substantial benefits can be realized by optical finishing laboratories.

In addition, hardness, strength, and impact resistance must meet certain minimum levels. For example, the material must be hard and tough enough to withstand, without cracking, the dropping of a standard steel ball from a certain minimum height. Resistance to notch sensitivity should be high so that there is a reasonable margin of safety in the event of impact.

One drawback in the manufacture of plastic ophthalmic lenses relates to the index of refraction of the underlying lens material. Plastic materials tend to have a low density and relatively low indices of refraction. The index of refraction of plastic lenses should approximate or exceed that of the glasses most widely used. If the index of refraction is relatively low, e.g. less than 1.5, thick lenses are required for high corrections. Materials having higher indices than about 1.55 are currently sought, because the lens can then be thinner and lighter for a given correction. In reducing lens thickness, however, improved mechanical properties are usually needed in order to maintain appropriate margins of safety.

The material must also, for eyeglass applications, be capable of compatibly receiving, and firmly bonding to, the available abrasion-resistant coatings, a number of which are now in use. Preferably, it should also be capable of receiving a tintable coating in any of a wide range of colors.

Generally, plastic lenses have been made from a variety of conventional plastic materials, such as polycarbonate, polyethylmethacrylate, and polyallyldiglycol carbonate. For many decades, the principal optical plastic used for making eyeglasses has been "CR-39", a polycarbonate product of PPG Industries. It has met in adequate degree all of the significant requirements as to optical properties, strength, index of refraction, cure time, processing criticality and compatibility with coating and tinting materials. Although improved over the years, its cost is relatively high, the index of refraction is only in a medium range, and its processing properties require relatively long cure times and involve substantial shrinkage.

Acrylics and polyesters have been given consideration over the years because they are inherently lower cost materials than the polycarbonates. As examples, U.S. Pat. Nos. 3,265,763, 3,391,224, and 3,513,224 record prior efforts to cast eyeglasses using polyester resins. U.S. Pat. No. 3,391,224, for example, proposes the use of a major proportion of an esterification reaction product, together with from 5% to about 20% by weight of methyl methacrylate and less than suitable for ophthalmic lenses. The esterified reaction product is mixed with the methyl methacrylate, thoroughly blended, and then catalyzed with 1.5 parts of benzoyl peroxide. Following curing for in excess of 17 hours in a casting cell at an elevated temperature, a grindable optical lens is said to be produced, but no figures are given for hardness, impact resistance, or index of refraction.

An attempt to achieve a balance of properties suitable for eyeglass lenses using polyesters and acrylics is evidenced by U.S. Pat. No. 3,513,224 to Sherr. The major portion of the composition taught by that patent is the esterification reaction product of fumaric acid, trimethylene glycol and neopentyl glycol, together with 12% to 18% of styrene and 8% to 12% of ethylene glycol dimethacrylate, suitably catalyzed after mixing. The styrene was used to increase the refractive index, but had a tendency to induce extensive cross-linking and therefore brittleness which was counteracted by the ethylene glycol dimethacrylate, which independently aided the impact strength. While this composition was said to be suitable for casting lenses, it required heating at 60° C. for 16 hours, then 100° C. for 90 minutes and finally gradual heating to 135° C. The resultant lens had a Barcol hardness of only 31 and a refractive index of 1.5248, which properties do not meet current norms.

Furthermore, the heating times and levels required were much too great.

Some commercial efforts, more recent than the patents listed above, have been reported pertaining to polyester casting materials for eyeglass lenses. These were apparently unsuccessful because of insufficient impact strength. Changes in the formulation were then understood to have been undertaken to improve toughness by increasing flexibility, but it is believed that the resultant material became extremely difficult to contour and polish. The products now appear to have been withdrawn from the market. A polyester based optical compound of about 1.56 index of refraction is now being offered on a commercial basis, however.

The current state of the art as to high index materials is summarized by an article by K. Angel in the magazine *Optical Index* for May 2, 1988 entitled "The High Index Race is on to Introduce Superior Products" (p. 24). This describes how the thinner, lighter lenses are expected to be increasingly employed for progressive, multifocal and higher correction lenses.

The relative cost of "CR-39" is only one reason that improved optical plastics are being sought for eyeglasses. "CR-39" undergoes substantial shrinkage when curing, so that most lens casting systems which use this material are adapted to compensate for shrinkage in such a way that they can form only one or two lenses at a time. The length of the cure cycle also increases processing and capital equipment costs. For long term storage, "CR-39" and its catalytic agents must be held at very low temperatures, because at ambient temperatures they tend to become explosive with time. The basic polycarbonate system is also quite reactive, and requires an alkaline catalyst, so that it gradually but persistently attacks molds, retainers, and other associated elements. This means that the molds have a limited life, and must be replaced regularly, further increasing costs.

In the casting of plastic eyeglasses, the resin is introduced between spaced apart glass or metal mold surfaces, encompassed about their periphery by a resilient gasket or retainer ring that is non-reactive, or substantially non-reactive, to the polymers being cast. It must therefore flow and remain stable for a reasonable interval without entraining bubbles or creating voids. As the material cures, generally under elevated temperature, pressure is applied to one or both of the dies to compensate for shrinkage, with the ring gasket compressing to accommodate the dimensional change. Examples in the patent literature are numerous, including U.S. Pat. Nos. 3,316,000, 3,240,850, 3,605,195, 3,211,811, 3,240,854, 3,422,168, 3,070,846, 3,056,166, 3,109,696, 4,191,717, 4,227,950, 4,197,266, 4,251,474, 4,257,988, 4,279,401, 4,273,809 and 4,284,591.

Most commercial eyeglass lens casting today, using "CR-39", is based upon the use of individual molds because of the mentioned shrinkage and control problems. However, many efforts have been made to cast lenses simultaneously in multiple molds, as evidenced by U.S. Pat. Nos. 3,871,610, 3,,806,079, 3,871,803 and 3,423,488. It is not known that these approaches have resulted in any successful high yield production manufacture, because commercial processes still largely rely on single or dual mold machines. Nonetheless, the potential benefits of using multiple mold casting machines are evident, if adequate yields of high quality products can be attained.

Standard corrections can be used for a substantial fraction of the eyeglass wearing population. About 50% of single lens corrections are accounted for by a limited number of curvatures. For these users, substantial savings can be realized if the lenses can be cast directly to prescription, as long as quality standards can be maintained. However, temperature, pressure and resin variations must be very closely controlled and the problems of casting to prescription curvatures are excessive with currently available materials.

The storage and processing characteristics of a resin system for casting optical products can be regarded as having almost equal importance to finished product properties. The fact that many chemical alternatives are available in a resin system to alter viscosity, strength, or toughness does not mean that all final objectives can be achieved. Styrene is incorporated in significant amounts in polyester resin systems to make the mass flowable and because it cross links on polymerization. When the styrene is increased, there is no marked increase in index of refraction. However, increased styrene has a tendency to increase brittleness and accelerate exothermic reactions resulting in fractures and discoloration within the coating. Improving index of refraction while also obtaining high impact strength, high resistance to notch sensitivity, low cure time, excellent casting properties and enhanced finishing characteristics therefore requires overcoming significant problems.

Optical plastics having superior properties for single vision eyeglasses obviously can be used with benefit in multi-vision glasses (bifocals and trifocals) as well. Moreover, they can be used for other optical applications, such as single or multi-element light focussing lens systems. The capability of plastics for complex curvatures such as aspherics and fly's eye lenses is well recognized. In addition, the optical properties of high index materials create potential for use in other applications, such as prisms, multi-faceted bodies and fresnel lenses.

SUMMARY OF THE INVENTION

We have found that plastic ophthalmic lenses having a usefully high index of refraction can be made from a combination of an unsaturated polyester resin; a monomer of the formula (I) below,

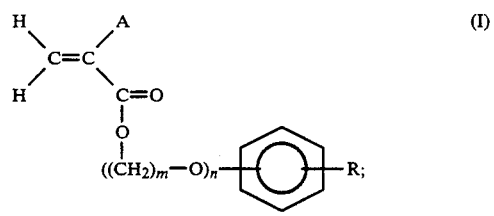

wherein A comprises a $C_{1-12}$ alkyl, R comprises a $C_{1-5}$ alkyl, m comprises an integer of 1 to 6, and n comprises an integer of 1 to 12; an optional vinyl monomer; and a free radical polymerization catalyst. This composition has exceptional casting properties and provides hard optical products with a suitably high index of refraction, low specific gravity and high impact resistance. The index of refraction is in the range of 1.56, the product has brilliant optical clarity, and the formulation cures rapidly without substantial shrinkage. Although hard and strong, the cast product when abraded does not have a sticky or adhesive characteristic. Thus, it can be contoured in a lens generator and polished with ease to the desired smoothness in a sequence that is substantially truncated in comparison to present procedures. The composition is stable wen properly stored, and is substantially non-reactive with mold and gasket materials, so that mold life is increased while polymerization is not inhibited. Its cost, even with all these advantages, is nevertheless substantially lower than the best presently available resin systems for the same applications. Furthermore, hard coatings can be applied with good adhesion for abrasion resistance, and the product may be tinted with conventional dyes.

The monomer advantageously comprises 6 to 12 parts by weight of phenoxyethyl acrylic ester, the optical and physical properties of which result in a superior interrelation with the base polyester vehicle. In addition, the processing conditions are stable and result in high yields with relatively low cure times. For some applications methyl methacrylate may be mixed with the base polyester resin vehicle and the phenoxyethyl acrylic ester monomer in selected proportions.

A stable but short term casting process with high yields proceeds by casting the composition at ambient temperatures into molds and allowing gelation to occur at ambient temperature to a point of surface hardness under some pressure. The casting is then heated in a one or two stage sequence under increased pressure until cure is substantially completed in about 40 to 150 minutes depending on the thickness. The cast product, after release from the mold, may be post cured at elevated temperature following the single stage cure sequence.

In an example of a two stage cure process, the casting is heated to about 110° F.-120° F. under increased pressure for about 30 minutes, and then at 170° F.-200° F. under increased pressure for about 1 hour until cure is substantially completed. The cast product is then released from the mold and no post curing is required. The two stage cure cycle can be carried out either in an oven or a water bath. This type of cure procedure is particularly useful for more extreme in curve thick lenses.

In a single cure step process, the casting is first gelled at ambient temperature and light pressure as previously described. The molding fixture and casting are then heated in an oven or liquid bath of 120° F. to 150° F. at 5.8-6.7 psi for 40 to 150 minutes, or at 170° F. to 200° F. at under progressively increasing pressure for 60 to 120 minutes. The mold pressure is determined from the force applied and the mold area. After release from the mold, post curing is typically used to achieve final hardness if the castings have been heated only to the 120° F.-150° F. level.

Casting systems and methods in accordance with the invention are capable of fabricating multiple lens blanks concurrently in sheet or stack form. A stack casting machine is provided in which multiple individual molds are fillable at aligned or common inlets, and includes pressure transferring elements between the molds. An axial force applying mechanism is employed to exert pressure, in the desired pressure profile with time on the stack which can then be placed in an oven for completion of the cure. A sheet casting system utilizes a plurality of web-interconnected molds within a frame assembly including means, such as an expandable bladder, for pressurizing the molds uniformly and also means for heating the composition when the molds are filled through a common inlet and so oriented that entrained bubbles migrate out before gelling is complete.

The composition and process of the invention are particularly suited to the incorporation of a hard coating compound on the finished optical surface during the polymerization steps. To this end, a layer of UV curable compound is coated onto a mold face and partially cured by ultraviolet radiation by exposure for 2-8 seconds. When the lens material is cast, gelled and polymerized as described, the coating is chemically adhered firmly to the resin surface. On removal from the mold, the coating is fully cured by another short exposure to UV radiation, depending on the coating used.

Casting processes and compositions in accordance with the invention are of relatively short duration but are not subject to instability problems from the exotherms that are generated even though the castings may vary substantially in mass and shape. The conditions of gelation dissipate the peak exothermic energy before curing temperatures are applied. The processes and compositions can be used to cast semi-finished lens blanks or finished thin eyeglass lenses which follow prescription curvatures on both sides and require only edge finishing.

BRIEF DESCRIPTION OF THE DRAWINGS

A better understanding of the invention may be had by reference to the following description, taken in conjunction with the accompanying drawings, in which:

FIG. 2 is a perspective view, partially broken away, of an assembly for pressurizing the multiple lens blanks in the system of FIG. 1;

FIG. 3 is a side sectional view of the assembly of FIG. 2;

FIG. 7 is a side sectional view of the arrangement of FIG. 6;

FIG. 8 is an enlarged fragmentary view of the arrangement of FIGS. 6 and 7; and

DETAILED DESCRIPTION OF THE INVENTION

Figure 1:
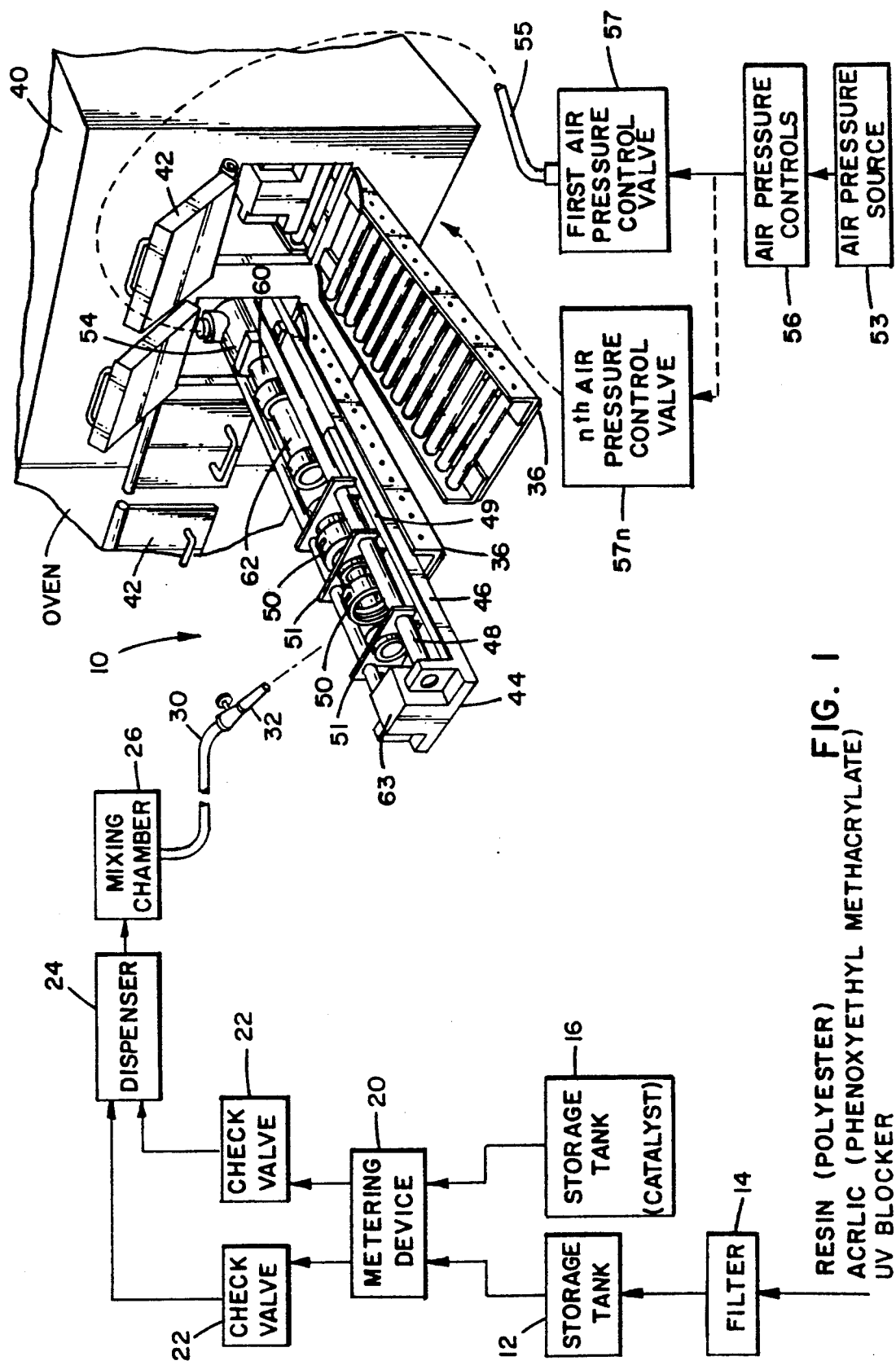
FIG. 1 is a combined schematic and block diagram representation of a first system in accordance with the invention for casting multiple lens blanks.
Figure 4:
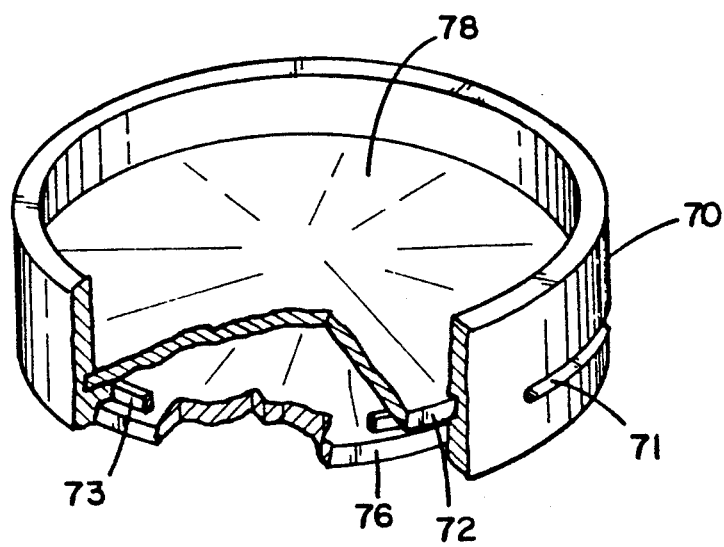
FIG. 4 is a fragmentary view of a spacer used in the arrangement of FIGS. 1-4.
Figure 5:
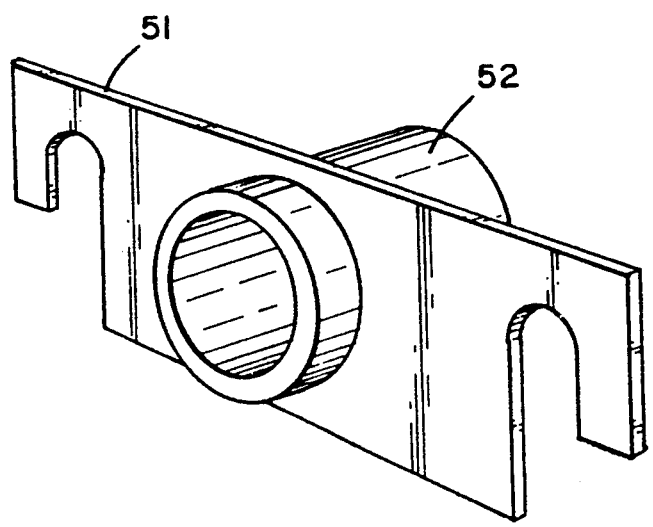
FIG. 5 is a perspective view, partially broken way, of an individual lens blank casting mold in accordance with the invention for use in the system of FIG. 1.

We have found that the plastic ophthalmic lens composition of the invention comprises a combination of an unsaturated polyester resin, an ethylenically unsaturated aromatic ester monomer, an optional vinyl monomer, and a free radical polymerization catalyst. The synthetic resin compositions are molded by casting the resin system in contoured optical molds.

Unsaturated Polyesters

The unsaturated polyesters of this invention are derived from the interaction of saturated or unsaturated dicarboxylic acids with polyhydric alcohols.

α,β-Unsaturated dicarboxylic acids having a least one ethylenic carbon-to-carbon double bond may be, for example, maleic acid, fumaric acid, itaconic acid, citraconic acid, meconic acid, and anhydrides thereof, lower alkyl esters thereof, or acid halides thereof.

Examples of the saturated dicarboxylic acid or its ester-forming derivatives are aliphatic dicarboxylic acids such as succinic acid, adipic acid, azelaic acid or sebacic acid, aromatic dicarboxylic acids such as terephthalic acid, phthalic acid, isophthalic acid, orthophthalic acid, and anhydrides of these acids, lower alkyl esters of these acids, and acid halides of these acids.

Among the polyhydric alcohols suitably employed are the diols such as ethylene glycol, propylene glycol, diethylene glycol, butylene glycol, trimethylene glycol, dipropylene glycol, and poly(ethylene glycol)s.

It is most preferred to use a polyester formed by the interaction of propylene glycol, phthalic anhydride and maleic anhydride, such as "S 40" (Silmar Division of Sohio Engineering Materials Co.). Alternatively, a preferred polymer base can comprise maleic anhydride, orthophthalic anhydride and propylene glycol, such as "Aropol L-2506-15" (Ashland Chemical Co.).

The base polyester resin system which is utilized in the invention has a molecular weight of 1500–5200, with an average molecular weight of 2470, a Brookfield viscosity at 25° C. of 440 cps, and a refractive index in liquid form of about 1.5412. Higher grades of commercial polyester resin products are preferably employed to achieve suitable freedom from color (whiteness), clarity and physical properties. It is preferable that the polyester system have a shrinkage of no more than about 6% upon curing. The Barcol hardness of the cured resin is typically about 40 to 43, depending on the temperature and the specific material. The uncured polyester resin system has a shelf life of approximately 4 months at 25° C., and can be held indefinitely if maintained at about 5° C. The polyester resins cost in the range of about $0.70 a pound. An unsaturated polyester resin such as "S-40" (Silmar Division) or "Aropol L-2506-15" (Ashland) is preferred as the main polyester resin because of the clarity, low cost and properties achieved when using this polyester resin.

In addition to the base polyester described above, an optional flexible polyester may be included in the ophthalmic plastic lens composition. As set forth above, the flexible polyester is produced by the interaction of an unsaturated or saturated dicarboxylic acid and a glycol. The flexible polyester can either be of the same formulation as the base polyester resin (i.e., S40) containing about 5% less styrene, or can be produced by the interaction of phthalic anhydride with ethylene glycol and diethylene glycol. It is preferred that the flexible polyester be made using the same alkyd as is used in the base polyester resin. The polyester is admixed with prepromoted styrene to produce a flexible polyester resin.

The flexible polyester resin generally has a molecular weight comparable to the base polyester and a Brookfield viscosity of about 400 cps at 25° C. A preferred flexible unsaturated polyester resin is "D 658" (Silmar Division of Sohio Engineering Material Company). Incorporation of the flexible polyester is indicated where the base polyester has a rigid and brittle characteristic. For example, the "S 40" base polyester resin system contains about 18% of the flexible resin "D 658", but none is incorporated in the "Aropol L-2506-15".

Ethylenically Unsaturated Ester Monomers

The ophthalmic lens composition of the invention contains an ethylenically unsaturated ester in combination with the polyester resin. The unsaturated esters which are useful in the ophthalmic lens composition of the invention comprise aromatic esters. The ethylenically unsaturated monomer with which the unsaturated polyester is cross-linked may comprise esters of acrylic acid and methacrylic acid.

The ethylenically unsaturated ester monomers which are utilized are of the formula (I) below,

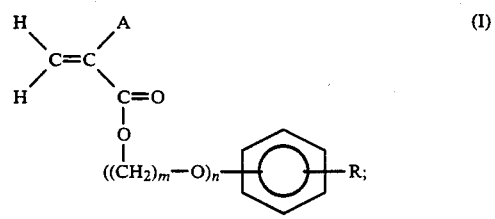

wherein A comprises a $C_{1-12}$ alkyl, R comprises a $C_{1-5}$ alkyl, m comprises an integer of 1 to 6, and n comprises an integer of 1 to 12.

Acrylate monomers that can be used in the ophthalmic lens composition of the invention include methyl acrylate, methyl methacrylate, phenoxyethyl acrylate, phenoxyethyl methacrylate, methoxyethyl methacrylate, methoxyethyl acrylate, ethoxyethyl methacrylate, ethoxyethyl acrylate, and others. Acrylate monomers are well known in the art.

Preferred unsaturated ester monomers of the invention comprise ethylenically unsaturated aromatic esters. An ophthalmic lens composition having a usefully high index of refraction and superior casting properties has been obtained when utilizing 2-phenoxyethyl methacrylate, such as "SARTOMER-340" (Sartomer Company). The "SARTOMER-340" acrylic ester has a molecular weight of 206, a refractive index of 1.511, and a specific gravity of 1.0687. It can be stored at 25° C. for about 6 months, and indefinitely at 50° C.

Where a lower index of refraction is acceptable, methyl methacrylate and phenoxyethyl methacrylate may be combined with the polyester resin in the ophthalmic lens composition.

The methyl methacrylate can be premixed with the catalyst in the desired proportions, usually about 1 part by weight of catalyst and stored for use at ambient temperatures since it has no dangerous properties. Premixing appears to improve mixing and polymerization.

When an ethylenically unsaturated aromatic ester is incorporated into the unsaturated polyester composition, the casting properties of the system are improved because the viscosity of the composition is lowered.

Vinyl Monomers

In addition to the polyester resin and the acrylic ester, the ophthalmic plastic lens composition of the invention also contains monomers which have a high reactivity with the double bonds of the unsaturated polyesters. However, these monomers are typically used in lower proportions than are employed in most commercial polyester resin systems since they tend to induce brittleness in the final product if present in high amounts.

Exemplary copolymerizable monomers include ethylene, propylene, isobutylene and other α-monoolefins; styrene-type monovinyl aromatic compounds such as styrene, methylstyrene, ethylstyrene and chlorostyrene; acrylic acid; methacrylic acid; diallyl maleate, diallylphthalate, triallylmellitate, ethyl acrylate, methyl methacrylate, isopropyl methacrylate, dimethyl itaconate, ethylene glycol dimethacrylate, diethylene glycol acrylate and other unsaturated esters; acrylamide, methacrylamide, acrylonitrile, and methacrylonitrile; vinyl chlorides; acrylics and methacrylics.

It is preferred to use a polymerizable styrene as the vinyl monomer in the ophthalmic lens composition of the invention. The polyester resin composition contains about 25-40% of the styrene monomer. The styrene monomer may be prepromoted. The "S-40" normally contains about 28-35% styrene, there being variations in different lots and new pollution requirements that impose limits on the styrene which can be used. It is preferred that the lower styrene content be used, because good results have been obtained with 28% styrene.

As disclosed in U.S. Pat. Nos. 3,265,763 and 3,457,104, the use of styrene in the composition eliminates the development of a haze in the casting. The use of substituted styrenes should be avoided when a clear, water-white composition is desired.

Catalysts

The ophthalmic lens composition is cross-linked or cured by initiating a polymerization reaction between the unsaturated polyester resin and polymerizable monomer with a free radical initiator. Polymerization catalysts useful for curing the ophthalmic lens composition of this invention are conventional free-radical generating catalysts, such as peroxides and keton peroxides, including methyl ethyl ketone peroxide, dicumyl peroxide, di-t-butyl peroxide, benzoyl peroxide, and lauroyl peroxide; and azo compounds, such as azobisisobutyronitrile, and the like.

Other Additives

If desired, photochromic materials may also be incorporated into the polyester resins used in this invention, thereby permitting changes from a colored sheet to a clear sheet and vice versa, due to the absence or presence of light, including sun light. If a permanent coloration is desired in the polyester resins, certain dyes and/or pigments may be dissolved in the unsaturated polyester resin in order to achieve the tinting effect. Typically, however, tints are applied to the surface to insure uniformity throughout the area of the lens.

The polyester.a/crylic system has a UV blocking characteristic of approximately 65%, which is superior to "CR39". However, by adding one-tenth of one percent to one-fourth of one percent of tin octoate, such as Tinuvin 327 (Ciba Geigy), the UV blockage characteristic can be increased to approximately 100%, if desired. The amount of UV blocker that need be added is below the level at which a severe yellowing tendency occurs.

Casting Compositions and Process

The ophthalmic lens composition of this invention typically comprises an effective amount of an unsaturated polyester resin; an effective amount of an ethylenically unsaturated aromatic ester; vinyl monomer; and a free radical catalyst. The ophthalmic lens composition is first cast at ambient temperature into one or a plurality of molds, which may be interconnected, and then allowed to gel at ambient temperature and light pressure for a period of time. The exotherm generated in the catalyzed resin system is substantial but not deleterious. Then the composition is raised to at least one higher temperature while being subjected to higher pressure to complete polymerization. The lens composition cures rapidly without substantial shrinkage, is stable and carried out with high yields.

The unsaturated polyester is prepared by any known method such as by polycondensing the acid component and the glycol component. The unsaturated polyester resin is combined with a limited amount of styrene, a reactive diluent, and with an unsaturated aromatic ester having a high index of refraction and functioning also as a diluent. The unsaturated polyester resin contains approximately 50-75% of the unsaturated polyester resin, and about 25-40%, preferably 28-35% of the styrene monomer which cross-links with the polyester. The flexible polyester may be incorporated as part of the unsaturated polyester resin composition to improve impact resistance of an unsaturated base polyester resin of rigid characteristics.

Typically, the ophthalmic lens composition of this invention is prepared using the following proportions: About 80 to 95 parts by weight of the unsaturated polyester resin, including the flexible polyester resin and styrene; about 6 to 12 parts by weight of an unsaturated aromatic ester; and 0.5 to 2 parts by weight of a free radical catalyst, such as a ketone peroxide. Preferably, for balanced physical, chemical and optical properties, the composition of the invention comprises about 89 parts by weight of the polyester resin system, about 10 parts by weight of phenoxyethyl methacrylate, and 0.5 to 1.5 parts by weight, preferably 1.0 part by weight, of methyl ethyl ketone peroxide.

The ophthalmic lens composition forms a flowable castable mass having a viscosity of about 500 cps at 25° C. The constituents of the composition may be stored for extended periods in stable form without special precautions.

Alternatively, the ophthalmic lens composition may contain the polyester resin, the phenoxyethyl methacrylate monomer, methyl methacrylate and catalyst. Typically, in this situation, 3-6 parts by weight of methyl methacrylate, and 4-8 parts by weight of phenoxyethyl methacrylate are utilized relative to 100 parts by weight of polyester resin. The methyl methacrylate can be premixed with the catalyst in the desired proportions and stored at ambient temperatures for a number of days before haziness is introduced. The premixing appears to improve distribution and polymerization uniformity.

A hard coating compound may be placed in the mold before the ophthalmic lens composition is cast into the molds, so as to form an abrasion-resistant surface on the ophthalmic lenses. In order to incorporate the optional coating compound, the concave mold is placed on a spinning holder with the mold face up under a hood which has de-ionized air blowing through it. Approximately 5 milliliters (ml) of a solvent, such as isopropanol, is placed in the mold surface to clean the surface, starting at the center and moving to the edge of the mold, while the mold is spun for approximately 15 seconds, or until all of the solvent has spun off and evaporated. Approximately 2.5 ml of a ultraviolet (UV) curable coating is applied to the mold so as to cover the entire face of the mold. It is preferable to use a UV curable coating such as "150 B" of Lens Technology. Alternatively, "Perma Clear" of the Sherwin Williams Company can be used as a coating. To insure complete and uniform dissipation of the coating material, the mold containing the coating is spun for approximately 45 seconds. The coated mold surface is inspected for cleanliness and coating coverage, placed on a conveyor belt, and is then exposed to UV radiation in a UV curing machine for approximately 2-8 seconds. If "150 B" is used as the coating, the UV exposure is for about 6 seconds so that the coating is completely cured. When "Perma Clear" is used for the coating, the initial UV exposure is preferably for about 2 seconds so that partial (about 25%) polymerization of the UV curable coating results. The surface of the coated mold is then placed under a stream of deionized air for 1-3 seconds, usually about 2 seconds. The ophthalmic lens composition is then added to the mold and the coating compound chemically combines with the casting during the polymerization steps of the process. After the lens is removed from the mold, full curing of the lens coating occurs by two additional one minute exposure to UV radiation at a slow conveyer speed if "Perma Clear" was utilized.

With a single stage cure process, generally preferred, substantially complete polymerization of a lens blank after gelation (as described below) takes place within 40 to 150 minutes at temperatures between about 120° F. and 165° F. and pressures of 5.8-6.7 psi, or at temperatures between 170° F. and 200° F. at pressures progressing from 12.5 psi to 25.8 psi. Processing characteristics at about 175° F. to 185° F. and 60 to 120 minutes cure cycle at pressures progressing from 12.5 psi to 25.8 psi are preferred, because the sequence is sufficiently stable under these conditions to enable very high yields to be attained without surface defects, yellowing, internal striations in the product, or undue adherence to the mold surfaces or chemical attack on the mold. Alternatively, the lens blanks can be processed at about 130° F. to 140° F. for a 90 to 120 minute cure cycle. The cure cycle is typically less than 2½ hours in order to conserve casting machine and mold time. Post curing after demolding is usually performed to get adequate hardness when the cure cycle temperature is less than 170° F. No post curing is required if the lens blanks are cured for at least one and a half hours at temperatures between 170° F.-200° F.

A two stage, two temperature cure cycle may be utilized in which partial polymerization of the casting takes place within 30-60 minutes at temperatures between 110° F.-120° F., preferably 115° F.-117° F., at a pressure of about 5-10 psi, preferably 5 psi, for cast objects the size of a typical lens blank. Substantially complete polymerization results after the castings are then subjected to temperatures between 170° F.-200° F. at pressures of 10-20 psi depending on the pressure the molds can withstand, preferably 10 psi, for at least one hour. This two stage cure cycle can be done in a conventional oven, or can be done in a water bath tank. If an oven is utilized, the preferred temperature of the second cure cycle stage is 180° F.-190° F., which results in a lens having a Barcol hardness of at least 48 at 70° F. When the water bath tank method is used, it is preferred that the temperature of the water bath utilized for the second stage of the cure cycle be between 180° F.-190° F. so that a Barcol hardness of 47-48 or more is obtained. The lens obtains a Barcol hardness of about 46 when the water bath tank is kept at a 170° F.-180° F. for the second stage of the cure cycle. The water cure cycle imparts a good water white color to the lenses and the effects of exotherms are reduced because heat is conducted away to the water. This results in less stress cracking of the lens product, less breakage of the molds, and easier control of the temperature in the water bath. Also more cleaning is needed after the water cure. Thus, with the use of an adequate gel time and pressure and two stage heating, oven curing is preferred for most compositions because the exotherm generated at higher temperature is in an acceptable range, and it is a much cleaner process.

To cast the ophthalmic lens composition using a single stage of heating, the polyester resin system and the phenexyethyl mehacrylate monomer are blended together. Filtering is used before blending if particulates such as dust or prepolymer seeds are entrained in the constituents. A catalyst, such as methyl ethyl ketone peroxide, is then added to the composition and mixed in. The catalyzed blend is cast at ambient temperature into one or a plurality of single or interconnected molds.

An initial gelation step, at ambient temperatures but light pressure, is used to establish a degree of solidification while dissipating heat until the peak of the exothermic reaction has passed. The composition gels in approximately 8 to 45 minutes, depending on the catalyst content and the temperature. Light pressure (e.g. 1.7-3 psi) is concurrently applied so as to maintain constant contact and hold the form of the casting as the material shrinks. Exothermic reactions may bring the temperature to about 150° F. for a time during the gelation period. After the exothermic peak is dissipated, thermal energy must be added to complete polymerization within a suitably short time span.

In one single stage cure process, after gelling for about 15-17 minutes, the mold temperature (for the single cycle cure) is brought to 130° F. to 140° F., at which time the molds are placed in an oven and the pressure is increased to about 5.8-6.7 psi. Alternatively, the total cure time can be 50 minutes at approximately 140° F. or about 40 minutes at 150° F. for substantially complete cure. If the cure temperature is above about 165° F. for a gelation interval of about 15 minutes, the exotherm tends to introduce excessive variation in the product. After a brief cooling period, the product releases readily from the mold. It is typically post cured at elevated temperatures (e.g. 180° F.) for several hours after this cure cycle to achieve total polymerization and full hardness. If not previously coated, the product may then be spun, spray, or dip coated with high hardness materials for abrasion resistance in known fashion.

Preferably for the single stage cure cycle, the composition is first gelled at ambient temperature (75° F.±7° F.) for 40-45 minutes, usually 45 minutes, under light pressure (e.g., 1.7 to 3.0 psi), until the composition reaches a firm gel stage or condition. A lead screw may be hand tightened against the molds to apply this pressure against the mold units at the beginning of the gelation stage. Most shrinkage of the casting occurs during the gelation period, so it is important to maintain pressure against the molds to limit the shrinkage and avoid "pull away" from the mold.

After gelling, a lead screw operated manually by a torque wrench is used to apply 12.5 psi of pressure against the molds. The mold temperature is then brought to about 170° F. to 200° F., preferably 175° F. to 185° F., for about one and a half to two hours, preferably for two (2) hours, by placing the mold units in an oven. The mold units, with 12.5 psi of pressure applied against them using the torque wrench as described above are left in the 175° F.–185° F. oven for about 20 minutes. The torque wrench may be used to increase pressure against the mold units during the remainder of the two (2) hour cure cycle. Thus the pressure against the molds is manually increased to about 15.8 psi for approximately 30 minutes, then to approximately 21.6 psi for about 30 minutes, and then to approximately 25.8 psi for about the last 40 minutes of the two hour cure cycle. Exerting constant mechanical pressure forces the direction and orientation of the molecules while the composition is being cured. Thus, the molecular orientation of the composition is aligned and maintained during the curing stage such that lenses with excellent optical and physical properties are obtained. The oven door can be opened briefly to make the manual adjustments with the torque wrench while maintaining the 175° F. to 185° F. oven temperature. Alternatively, a slide opening can be placed in the oven door so that the torque wrench can be inserted through the opening to make the necessary pressure adjustments, thereby reducing the amount of heat loss when the oven door is opened. No post curing of the lens is required.

The pressures given herein relative to the exertion of compressive forces on the lenses during curing are calculated from the forces exerted and the area of the lenses themselves (typically 76 mm (or 3") diameter). For example, a pneumatic piston of 1.0 inch diameter acts on a stack of lenses to provide a force of 25.5 pounds (lbs) at 20 psi on the piston. This converts to an actual applied pressure on 3 inch diameter lenses of 3.3 psi. Similarly a torque of 20 inch-pounds (in lbs) acting on a threaded lead screw exerts a force of 95.5 lbs, which establishes a pressure of 12.5 psi on lenses of the same diameter. Actual force exerted by the torque wrench/lead screw configuration was measured by a pressure sensor and calculated from the effective area of the sensor that was exposed to the applied force. In all instances, therefore, the pressure given is that acting on a lens or on the lenses.

In the two step method for casting ophthalmic lenses, the polyester resin system and the phenoxyethyl methacrylate monomer are blended together and mixed with methyl ethyl ketone peroxide, as above. The catalyzed blend is cast at ambient temperature into one or a plurality of molds to which a UV curable coating has been applied, as described above. A coating such as "Perma Clear" of the Sherwin Williams Company or preferably, "150 B" of Lens Technology, may be coated on the mold surface and cured as described above, before casting takes place. After filling the mold, the ophthalmic lens composition is partially cured at room temperature for approximately 8 to 20 minutes, generally 15–20 minutes, depending on the catalyst content and the temperature. An ambient temperature of 75° F.±7° F. is sought to be maintained for consistency. Pressure (e.g. 10–18 psi) is applied so as to hold the form of the casting. The gel reaches a soft surface condition in this time, and is no longer free flowing. Gelling at ambient temperature allows the exotherm that develops after catalysis to pass its peak, and minimizes problems with cracking and yellowing if subsequent processing is carried out correctly. The exotherm peak varies in general relation to the thickness and volume of the part. By gelling at room temperature for the defined time and pressure until the soft gel, Stage B condition is reached, the temperature of the gelled composition reaches only approximately 180° F.

After gelling, the mold assembly is placed in an oven held at a constant temperature of 100° F. to 130° F., preferably 100° F.–120° F., for the first stage of the cure cycle. The pressure is increased to about 5–10 psi, preferably 5 psi. The mold assembly is kept in the first oven stage for about 30 minutes or more, up to approximately 4 hours, preferably, however, for 30 minutes. During this time the composition may reach a peak internal temperature of about 150° F. at an ambient temperature of about 75° F. when glass molds are utilized and the path being molded is of typical thickness for a semi finished lens blank. The second stage of the cure cycle uses the same or a different oven which is maintained at a constant temperature of 170° F.–200° F., preferably 180° F.–190° F. The pressure during this second heating step is at 10–20 psi, preferably 10 psi, and the temperature and pressure are held for at least one hour. The mold assembly is then removed and the castings are extracted, at which point no post curing is needed. The UV coating, which adheres with a strong bond to the casting and fully releases from the mold surfaces, is then exposed to a UV source and fully cured (if "Perma Clear" was used), as described above.

Alternatively, following gelation, the mold assembly can be placed in one or two water baths which are maintained at the same temperatures as discussed above for each cure cycle utilizing an oven.

The composition should be cured for at least one hour during the second stage of the cure cycle when utilizing either the water tank or oven in the two stage cure cycle, or it will not be fully cured, and will not obtain the requisite Barcol hardness. Second stage curing can proceed for more than one hour without damaging the product, but there is a tendency for some yellowing to appear after approximately 90 minutes. Utilizing a two stage cure cycle substantially eliminates the likelihood of cracking the cast product since the cast composition is not subjected to drastic temperature fluctuations. Temperatures of more than 200° F. in the second stage of the cure cycle utilizing ovens also complete the curing process, but can result in a cast product having a slight yellow color.

After a brief cooling period, the product of the two stage cure cycle technique releases readily from the mold. If not previously coated, the product may then be spun, spray, or dip coated with high hardness materials for abrasion resistance in known fashion if desired.

By using a substantial gelation period at approximately room temperature (75° F.±7° F.), air bubbles can rise to the top of the composition contained within the mold so that the air bubbles are not trapped in the lens blank. In addition, a slow initial polymerization action occurs during the gelation period which aids in the gradual dissipation of exothermic heat from the composition, reducing the likelihood of the lens cracking due to heat stress.

When the soft gelled composition is put into the 110° F. to 120° F. oven or water tank for about 30 minutes, the polymerization reaction of the lens composition is stabilized. The molds containing the lens composition are not subjected to significant thermal shock when inserted in the oven or water bath tank at these temperatures, but the rate of the polymerization reaction and the speed or time of the curing cycle are both increased, thereby reducing the time and cost of production. At the end of the gelation interval, the casting has hardened but is still well below maximum hardness level. Further, by utilizing the 110° F. to 120° F. range with increased pressure against the molds, it has been found that the mold follows the shrinkage of the lens, and thus, there is no mark off of the lens, i.e., the lens does not pull away from the mold.

Using the oven or water bath tank at higher temperatures to achieve complete polymerization (full cross linking of the composition) also imparts the requisite Barcol hardness. The concurrent increase of pressure assures that the mold maintains 100% contact with the lens and there is no "pull away" of the mold from the lens at these temperatures.

A normal filtering step to extract dust and other particulates of 2 micron size and greater from the resin constituents may not be needed if clean room conditions are maintained. The mixing can be accomplished by a metering system or by a continuous mix and feed system. Preferably, resin is drawn from the bottom of a tank and thoroughly mixed with catalyst fed from a similar source to avoid the introduction of air. Uniform mixing is desirable because of the acute sensitivity of the eye to striation in a finished lens.

The temperatures maintained reduce the viscosity and the cure time, but a critical threshold is not approached even under the exothermic rise occurring in the center of a thick lens blank if conditions are maintained as specified. If a larger volume of material or a shape of widely varying cross section is to be cast, then the temperature and time may be adjusted accordingly. There are substantially no thermal shocks on the resin system that accelerate or inhibit cure when cast in this manner. Consequently, there is no substantial differential shrinkage and the product releases readily from the mold.

Multiple lenses or large lenses can be cast because the composition flows readily without entraining bubbles or leaving voids, because shrinkage is limited and controlled and because exothermic reactions are maintained within limits. The degree of control is such that multiple lenses may be cast in sheet form, interconnected by webs, or in stack form, serially interconnected along at least one side by a feed system. Either form may be coated as cast, or separated, edged, cleaned and then coated. Eyeglass lenses may be cast to prescription, with preselected curvatures on each side, by using spacers sized to control the final thickness (usually about 2 mm) of the eyeglass lens.

Even though the individual constituents of the ophthalmic lens composition have a Barcol hardness of about 43 or less, the resultant polymerized composition has a Barcol hardness of 47–50 at 70° F.–75° F. Further, the cured composition has a high index of refraction of about 1.56. Shrinkage is limited to about 6% or less during curing and is readily controlled by the increasing pressure profile with time. The specific gravity of the product is only 1.19, in contrast to 1.30 for CR-39 materials and modified high index materials with specific gravities from 1.43 to 1.47.

The chemical system is not materially inhibited by or destructive to silicone materials and other elastomeric materials which are widely used as seals and retainers in casting systems. Surface inhibition at the edge of the casting may sometimes appear but does not penetrate into the interior volume or affect optical properties. Also, glass or metal molds can be used without reactive effects, and the thickness of the casting can range from wide to narrow. Unlike prior art systems, operation under vacuum or lowered pressure conditions does not cause significant boil-off, so the composition can also be cast or processed using low pressures for conforming to mold surfaces or extracting entrained air.

Because of the significant amounts of polyester employed in this formulation, its cost is less than two-thirds of the polycarbonate-based systems. In addition, the material grinds and polishes so readily that the finishing operations can be reduced from a typical five steps to three steps or even less.

A unique balance of properties required for the casting process and in the final product is achieved by combinatorial effects of a nonlinear nature. In addition to providing an improved refractive index, the phenoxyethyl methacrylate monomer and the styrene reduce the viscosity and increase the flowability of the polyester vehicle, so that high temperatures are not needed for casting. The presence of the phenoxyethyl methacrylate monomer appears to counteract the tendency of styrene to introduce brittleness and notch sensitivity, and the impact strength substantially surpasses the Food and Drug Administration standard drop ball test. Moreover, there is substantially complete freedom from striations, bubbles, surface effects and off-white coloring.

Casting Systems

FIGS. 1–5 depict the general arrangement and specific details of a casting machine 10 for concurrently forming a number of finished lens blanks on a production basis. This is one example of the manner in which a geometrical arrangement (typically planar or linear) of lenses can be cast and formed concurrently. As shown in FIG. 1, the base polyester resin, including styrene and flexibilizer polyester, the phenoxyethyl methacrylate and the UV blocker are passed through a filter 14 into a large storage tank 12. The filter 14 is one of the known commercially available systems which separates dust and other particle matter of greater than 2 micron size from the resin mix. It is also preferred to maintain the entire casting machine 10 under clean room conditions in conjunction with de-ionized controlled air flow so as to prevent as much as possible the introduction of minute particles which might be apparent in the finished product.

A separate, typically smaller, storage tank 16 for the catalyst (and its accompanying vehicle/carrier) is also used. From the catalyst storage tank 16 the material passes to a metering device 20, which receives the catalyst and polyester-acrylate-UV blocker composition at separate inputs. The metering device 20 is of a commercially available design, and upon actuation feeds controlled amounts of the polyester composition and catalyst in separate lines through check valves 22 to a dispenser 24 which feeds the separate polyester composition and catalyst components into a mixing chamber 26. The catalyst may be premixed via a separate dispenser (not shown) into one of the components, or combined in other ways that introduce no substantial delay. From the mixer, the constituents are fed out a flexible feed line 30 to a nozzle 32 at the dispensing area. Different sets of molds may be filled at the dispensing area.

A number of individual roller conveyors 36 (only two are shown for simplicity) are disposed at the mold filling area, and lead to a curing oven 40, each roller conveyor 36 feeding through a different door 42 in the oven, the door being hinged to permit entry of an associated slide assembly 44. Each slide assembly 44, only one of which will be described, has an elongated frame 46 extending along a longitudinal axis which is along the path for entry of the assembly 44 through a door 42 into the oven 40. Longitudinal rods 48 are disposed parallel to the longitudinal axis of the frame 46, on each side of the center. The frame 46 and rods 48 provide a sufficient rigidity in the structure to withstand substantial compressive forces. Individual casting mold units 50 of generally cylindrical form are seated on a longitudinal groove along a support base 49 on the frame 46, and alternated with individual slide separators 51 (best seen in FIGS. 2 and 5) that are suspended on the rods 48. Each of the separators has an approximately centrally disposed spacer ring 52 which protrudes in the opposite directions along the central axis from the separator 51 so as to engage aligned glass or metal mold elements in the units 50.

An air pressure source 53 remote from the oven provides a predetermined maximum amount of air pressure for energizing a cylinder 54 disposed on one end of the slider assembly frame 46. Air pressure is supplied via a flexible air line 55 that extends into the oven and has sufficient length to permit movement of the slide assembly 44 into and out of the oven. External to the oven 40, an air pressure control 56 provides an individual control for the pressure in each air cylinder 54. This control may be automatic, even if a time-varying pressure cycle is to be applied. In one conventional example, the air pressure control 56 may comprise a plurality of cams (not shown) mounted on a common shaft and rotating slowly at a controlled rate. The cams may be pivotable about the common shaft by the operator, to be set to zero when a slide assembly 44 is moved into the oven 40 for curing to begin. A follower associated with each of the cams may then operate an individual pressure control valve 57 to vary the pressure within the associated air cylinder 54 in accordance with the increasing pressure profile. Manual control is typically used because the pressures are held constant during gelling and curing in most examples. A cylinder shaft 60 coupled to the piston interior to the cylinder 54 extends outwardly from the cylinder 54 and moves an axial extension 62 which bears against the stack of mold units 50, compressing them in accordance with the pressure variations with time against a fixed end 63 on the slide assembly 44.

The individual mold units 50 (FIGS. 2 and 3) are essentially three part combinations, centered within a circular retainer ring 70 of silicone and having a side aperture 71 for filling the mold. An inner ridge 72 about the ring 70 has an axial dimension that defines the nominal spacing between the male convex mold 76 on one side and the female concave mold 78 on the other side of the center. The gap between the mold 76, 78 faces is reduced with time, as described below, since the compressive forces exerted take up the shrinkage in the casting. A metal ring 73 (best seen in FIGS. 3 and 4) within the inner ridge 72, however, defines the final thickness of the prescription lens to be cast. The spacer ring 73 has openings to permit inflow of the resin on the upper side. Glass molds are typically substantially thicker than metal molds, which also have a relatively thin outside lip. To receive metal molds securely, a small groove 74 is disposed in the inner wall of the ring 70, adjacent the inner ridge 72. Thus the ring 70 can be used with opposing glass molds or with one metal mold and one glass mold. Metal molds can be produced to precision shape using electroless deposition techniques to conform to a master element.

It is convenient for many purposes to feed the mix into the molds via a disposable interconnecting sprue 79 (FIG. 3 only). When the products are removed from the molds they then are interconnected for easier application of coatings, until separated for edging.

A suitable selection of pairs of male and female molds 76, 78 are chosen to provide the sequence or combination of curvatures desired, and these are paired together in the mold units. The mold units 50 are then placed in sequence on the slide assembly 44, with the slide separators 51 disposed between each of the mold units 50. In this position, the outer surfaces of each of the molds 76 or 78 are engaged by the opposing faces of the spacer rings 52 on the separators 51. Also, the retainer rings 70 are aligned so that the side apertures 71 are at the top of the slide assembly 44, for filling individually or via the sprue 79. The mold units 50 are then filled with polyester/acrylic/catalyst mix via the nozzle 32, so that the operator can manipulate the nozzle to fill the space in each of the mold units 50 through the apertures 71 by gravity. The slide assembly 44 is then simply held in position for a period of time, with low air pressure applied, as gelling takes place, in accordance with the time and pressure conditions previously discussed until the desired surface condition is obtained. During this time, any air bubbles entrained during casting move through the mass during gelling and are not entrapped in the cast product. Air bubbles can, of course, be minimized by withdrawal from the bottom or be relieved through the application of a vacuum or low pressure if desirable.

When gelling has proceeded sufficiently the assembly 44 can be moved through the associated door 42 into the oven 40, at the appropriate initial temperature and pressure for single or two stage curing. This temperature is substantially constant throughout, and the intermittent entry and exit of assemblies through the doors 42 does not materially affect internal temperatures. The temperature of the gelled material gradually increases as the entire slide assembly 44 becomes heated to oven temperature. The operator moves the appropriate control 56 to operate the associated pressure control valve 57 so as to pressurize at the desired level.

If a minus correction semi-finished blank is cast, it is thicker in the outer regions than in the center region, and thus the exotherm that is inherent in curing can vary the degree of internal heating somewhat. However, when temperatures are properly maintained there is a substantial safety margin, and exothermic heat is limited by the initial gelling step and also dissipated through the remaining structure, which acts as a heat sink. Products made using the controlled conditions are free of differential shrinkage, whereas substantially higher cure temperatures can induce the pulling away of the casting from the mold in the central region.

As the curing cycle proceeds, the compressive forces continue to urge the mold against the casting surface, precisely defining the convex and concave curvatures, despite shrinkage, as the cast product hardens.

At the end of the curing cycle, the compressive forces are totally relieved, and the slide assembly 44 is moved back out through the oven door 42 on the conveyor 36. The individual mold units 50 are then cooled for about 15 minutes, separated from the slide assembly, and opened. This demolding typically is accomplished merely by a light pressure or by a vibration device, such as an air hammer, because there is virtually no tendency to adherence. The prescription lenses or semi-finished blanks can then be inspected. No further processing is needed apart from the application of abrasion-resistant coatings (if not previously done). Conventional coatings can be applied by spin coating or dipping, followed by post curing for about 2 hours at 180° F. Newer or curable abrasion-resistant coatings are UV curable within 10 minutes, and some of these even accept tinting compounds.

After casting to prescription, tinting is also frequently added. It may be necessary to wash the products to insure freedom from dust and adherent material. However, the lenses thereafter need only be cut to shape and edged before installation. With semi-finished lens blanks, the concave surface must be ground and polished before coating, tinting and edging.

Figure 6:
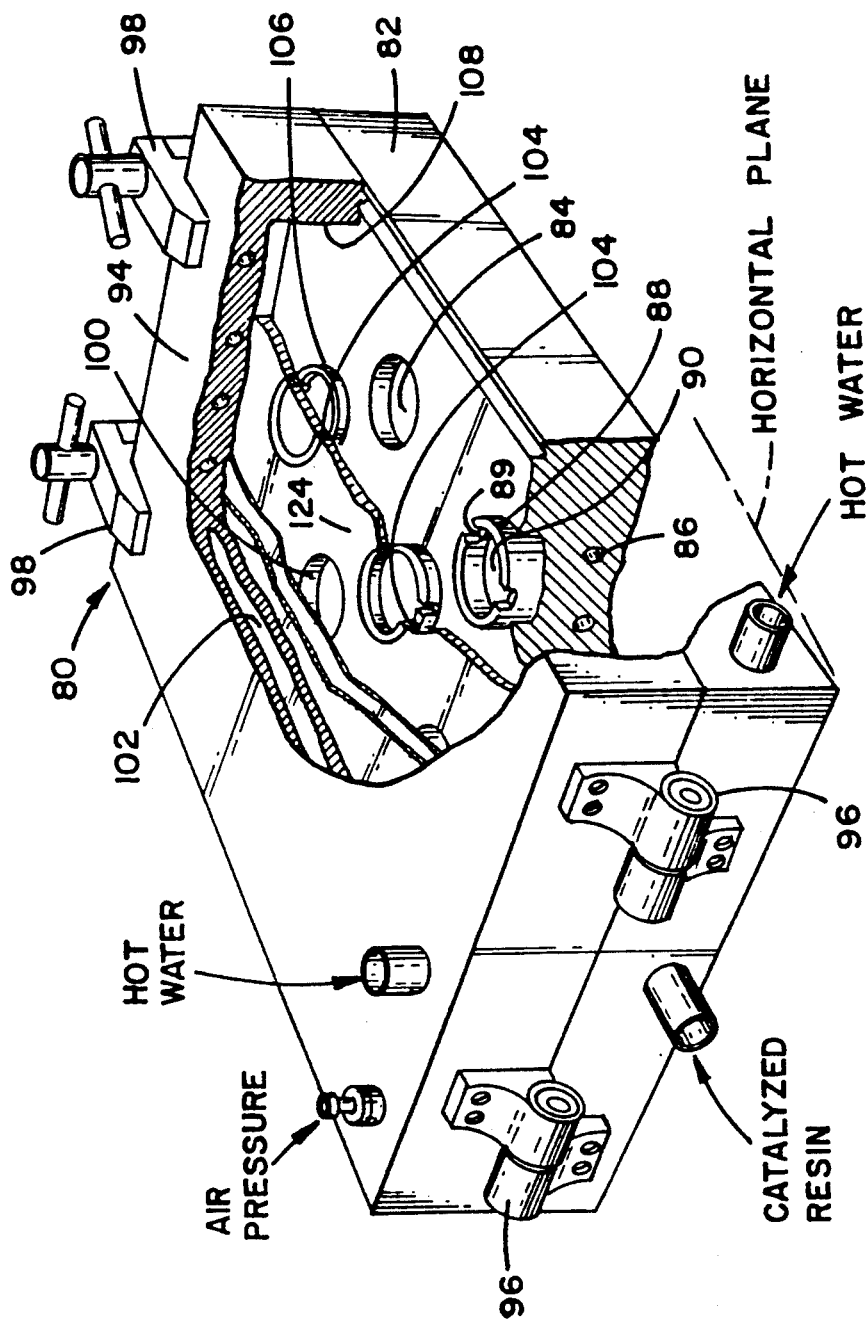
FIG. 6 is a perspective view, partially broken away, of a second system for casting a sheet of lens blanks in accordance with the invention.

A method and system for molding sheets of material to incorporate ophthalmic lenses having at least one finished optical surface is shown in FIGS. 6-8, to which reference is now made. The sheet molding press 80 is configured with a relatively massive base frame 82 that is substantially rigid under the pressures and forces to be exerted, the base frame having an array or matrix of concavities 84 for receiving half-units of molds for making individual eyeglass lenses. The base frame 82 is typically mounted at an angle of inclination relative to the horizontal (or alternatively adapted to be moved to such an inclined position) for purposes of filling with the resin mix. Internal fluid conduits 86 defining a serpentine path for uniformly heating the base frame 82 extend adjacent the concavities 84. Each of these concavities 84 receives a lower sealing ring 88 within which a lower optical mold 90 of glass or metal is positioned, the mold 90 being firmly seated against the base of the concavity 84 or alternatively within a shoulder on the base frame 82. The lower molds 90 are of thickness such that their upper surfaces lie in precise relationship to a given nominal plane within the press 80 when it is closed, so that it defines one surface (e.g. the concave surface) of the eyeglass, and constitutes a rigid reference for defining the thickness of the eyeglass. The lower sealing rings 88 each include radial grooves 89 for feed through of liquid resin when filling the system.

A mating upper frame 94, also of relatively massive and metal construction is mounted on hinges 96 along one edge of the base frame 82, so that it may be opened and closed along the hinge axis, which here is at the lower end when the assembly is inclined. Clamps 98 are mounted along the opposite edge from the hinges 96, to secure the upper frame 94 onto the base frame 82 in fixed parallel relation when the upper frame is closed. The upper frame 94 includes an array of apertures 100 that are similarly disposed to the concavities 84 in the base frame 82, and internal conduits 102 defining a serpentine path adjacent these apertures 100. Each aperture 100 is peripherally joined by an upper sealing ring 104 within which is seated an upper optical mold 106, which is resiliently movable against the sealing ring 104. The surface of the upper optical mold 106 that faces the lower optical mold 90 defines the upper (e.g. convex) surface of the eyeglass lens. The upper surface of the upper optical mold 106 is preferably substantially flat to receive compressive forces, as described in more detail hereafter. When the upper frame 94 is closed on the base frame 82 an inlet conduit 107 leads into the interior space between the frames 82, 94 and the mold pairs 90, 106. A peripheral ridge 108 seals off the interior at the perimeter of the press 80 when the press is closed.

A resin dispenser system 110 as described above is utilized for feeding a predetermined resin mix via the inlet conduit 107 into the space between the upper frame 94 and base frame 82 with the assembly in the inclined position. The mixture is confined within the boundary of the press 80 by the peripheral ridge 108 when the hinged upper frame 94 is secured and clamped to a given spacing.

A hot water source 112 providing 130° F. to 140° F. water is coupled by a line 113 through a flow control 114 to the internal conduits 86, 102 in the base frame 82 and upper frame 94 respectively. The flow control 114 may be controlled manually or by an automatic timer of conventional type so as to start heating the press 80 and the internal resin system at the predetermined time.

On the upper side of the upper frame 94 is disposed a silicone bladder 118 coupled to an air pressure source 120 via an air pressure control 122. The silicone bladder 118 extends throughout the space between the upper surface of the upper frame 94, and a rigid plate 124 about the upper half units, and the bladder 118 contacts the flat upper surface of each upper optical mold 106. Thus, when the interior of the bladder 118 is pressurized, uniform pressures are exerted on the upper optical molds 106, forcing them toward the lower optical molds 90.

Casting operation in the sheet molding press 80 of FIGS. 6 to 8 can be commenced after closing the upper frame 94 onto the base frame 82, and securing the clamps 98 to maintain a precise spacing, peripherally sealed, between the facing surfaces of the frames 82, 94. In this position, the upper sealing rings 104 are compressed against the lower sealing rings 88, with the radial conduits 89 providing passageways for the passage of resin into the spaces between the optical molds 90, 106. Because the space between the frames 82, 94 is inclined upwardly from the hinged end, when filling, a measured amount of resin can be fed from the dispenser system 110 through the inlet conduit 107 at the lower edge. The interior space, including each space between facing optical molds 90, 106, then fills with resin as the level rises, until the interior space is entirely filled. Concurrently with the filling, which is done at ambient temperature, with the frames 82, 94 being unheated unless the ambient temperature is below 60° F., bubbles entrained in the resin rise to the upper edge and pass out an overfill tube 126 (FIG. 7) along the clamped end. While filling is taking place, the silicone bladder 118 is substantially unpressurized, and, the engagement of the upper optical molds 106 within the upper sealing rings 104 aids in limiting movement of the upper sealing rings 104 and upper optical molds 106 as filling takes place.

The resin in the fill space is then allowed to gel under time, pressure and temperature conditions as previously stated. Where a large number of lenses is to be cast in a single sheet, it may be desirable to degasify the resin prior to dispensing, or to draw a vacuum in order to aid removal of bubbles. Preferably, the press 80 is operated under clean room conditions, to avoid the introduction of dust and other minute impurities into the lenses being cast.

After gelling is substantially complete, the air pressure control 122 begins pressurizing the silicone bladder 118 at a higher constant level. Being confined between the upper frame 94 and the rigid plate 94, the silicone bladder 118 compresses the upper optical molds 106 uniformly downward. At the same time, hot water from the source 112 is fed by the flow control 114 into the conduits 86, 102, to raise the temperature to the cure level. The temperature and pressure are maintained in accordance with single level or two level cure cycles as chosen for a particular composition. After curing, the upper frame 94 may be released at the clamps and hinged open to expose the sheet of cast semi-finished blanks interconnected by web material.

Not only does this arrangement enable a single cure cycle to cast multiple lenses, but it has further advantages in processing, because each side of the sheet may then be coated with an abrasion-resistant coating while in sheet form, if an in-mold coating was not previously employed. Furthermore, after coating, the individual lenses can be cut out and trimmed much more readily than is otherwise the case. If the lenses are not coated, dust occurring from the trimming operation must be more carefully removed using liquid means.

Appropriate tints can be applied to one or both sides of the sheet of lenses before, during or after coating depending on preference, if uniform tinting colors are desired.

Figure 9:
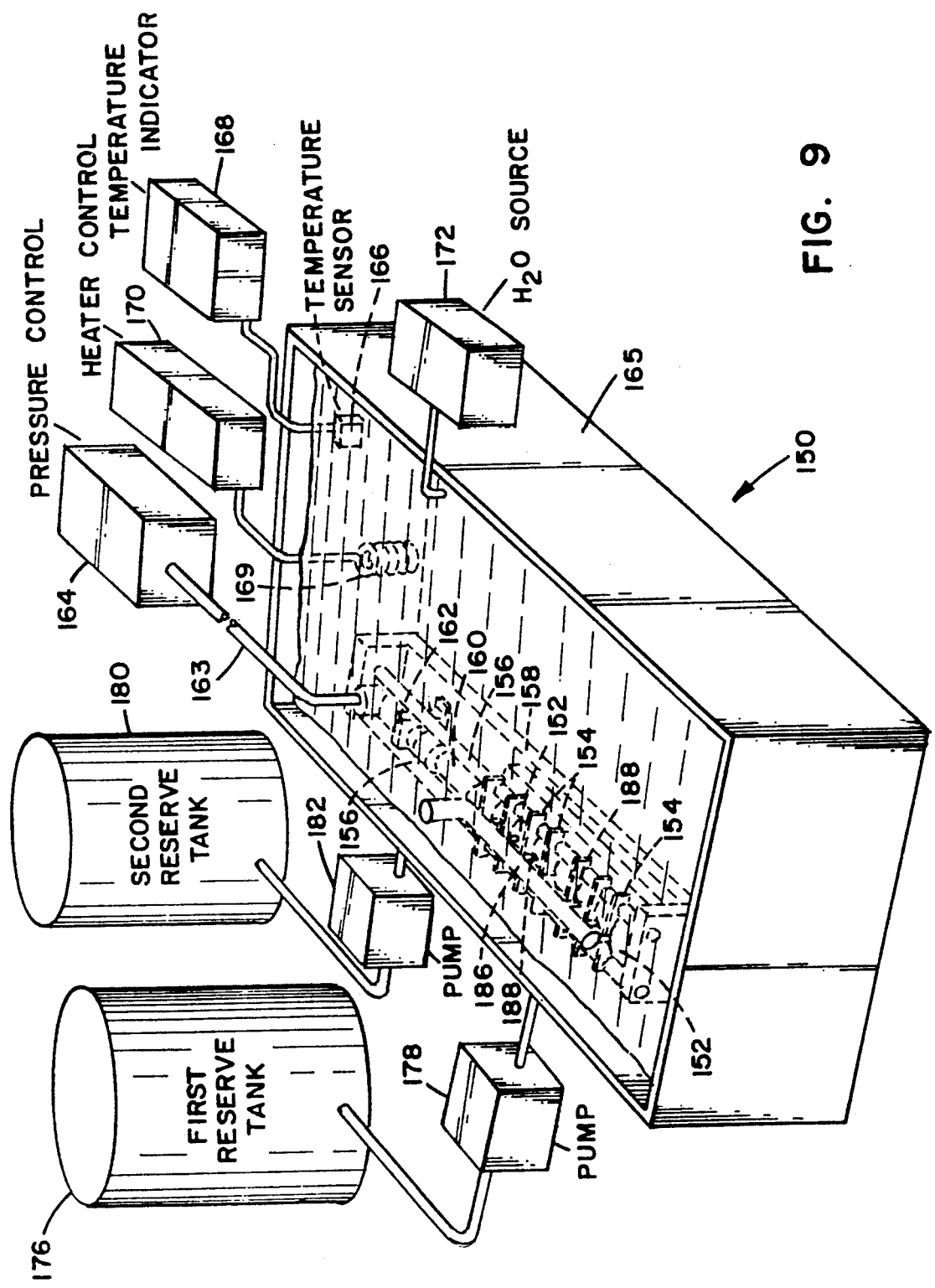
FIG. 9 is a combination perspective and block diagram view of a liquid bath curing system in accordance with the invention employing a pressurized casting system of the type shown in FIGS. 1 and 2.

FIG. 9 depicts the broad aspects of a water bath curing system 150 for concurrently curing a number of lens blanks after completion of gelation to the desired state of hardness. As in the example of FIGS. 1-5, a stack of individual mold units 152 on individual hangers 154 is disposed on slide bars 156 parallel to a horizontal axis in a frame 158 having fixed ends bordering the stack. A piston 160 and drive cylinder 162 on the frame 158 are movable with respect to it, and pressure is exerted by the piston 160 on the stack by a manually adjustable pressure control 164 via a flexible pressure line 163. As will be understood, any of a wide variety of production conveyors and processing stages can be used and these will only be mentioned since they are optional and not of significance to the invention. The frame 158 may be handled manually in moving from a gelation area to a first water tank and then to a second water tank for a two stage cure. However, an automatic conveyor system of linear or rotary form may also be used, with the frame 158 being lowered into position for immersion. The same pressure control 164 may be kept coupled to a given drive cylinder 162 through the use of a long flexible line 163, or separate couplings may be made at each stage. Frames 158 with stacks of mold units 152 may be advanced and pressurized in sets or individually through the different stages. Other handling systems will readily suggest themselves to those skilled in the art.

In the present example, however, the water bath curing system 150 is shown as it may be realized using a single water tank 165 into which water at different temperatures is pumped for the two different cure stages. The tank 165 includes an immersed temperature sensor 166 and an external indicator 168, by which an operator may exercise precise regulation using an immersion heater 169 that is manually adjusted at a control 170 or a cool water source 172, as needed. Water may alternatively be continuously circulated through the tank 165 at the desired temperature, or a large volume tank may be used with continuous agitation to assure local temperature stability.

In this simplified example, however, first and second reserve tanks 176, 180, intercoupled to the tank 165 by separate bidirectional and manually controlled pumps 178, 182 are used to change the water when a different curing temperature is needed, in preference to moving the frame 158 and mold units 152 themselves. Thus, for the first curing stage, water preheated to the desired temperature range is drawn from the first reserve tank 176 via the pump 178 to fill the tank 165 to the desired level. When the stage has been completed, the water is returned to the first reserve tank 176 and the second pump 182 is operated to fill the tank 165 with water at a higher temperature from the second reserve tank 180. The operator can maintain the temperature closely using the immersion heater 170 and water source 172.

As seen in FIG. 9, the inlets to the mold units 152 are all fed in common from a fill manifold 186 via individual sprues 188, and these may be maintained in position if desired to isolate the mold inlets at least during the first cure stage. However, the resin system has adequate solidity after gelation, and sufficient pressure is exerted, to resist intrusion by water unless pressure is totally relieved and the mold units 152 are not in full contact.

The tank 165 is shown as a single unit only for ease of understanding, it being clear that a much larger tank could be used to hold a number of mold stacks placed in position concurrently or sequentially. The advantages of water curing, however, are evident from this example. Once the water is heated, energy demands are small. The water functions not only to heat, but as a thermal sink so that exothermic heat can be conducted away quite readily. Substantial overheating and localized overheating are highly unlikely.

Figure 10:
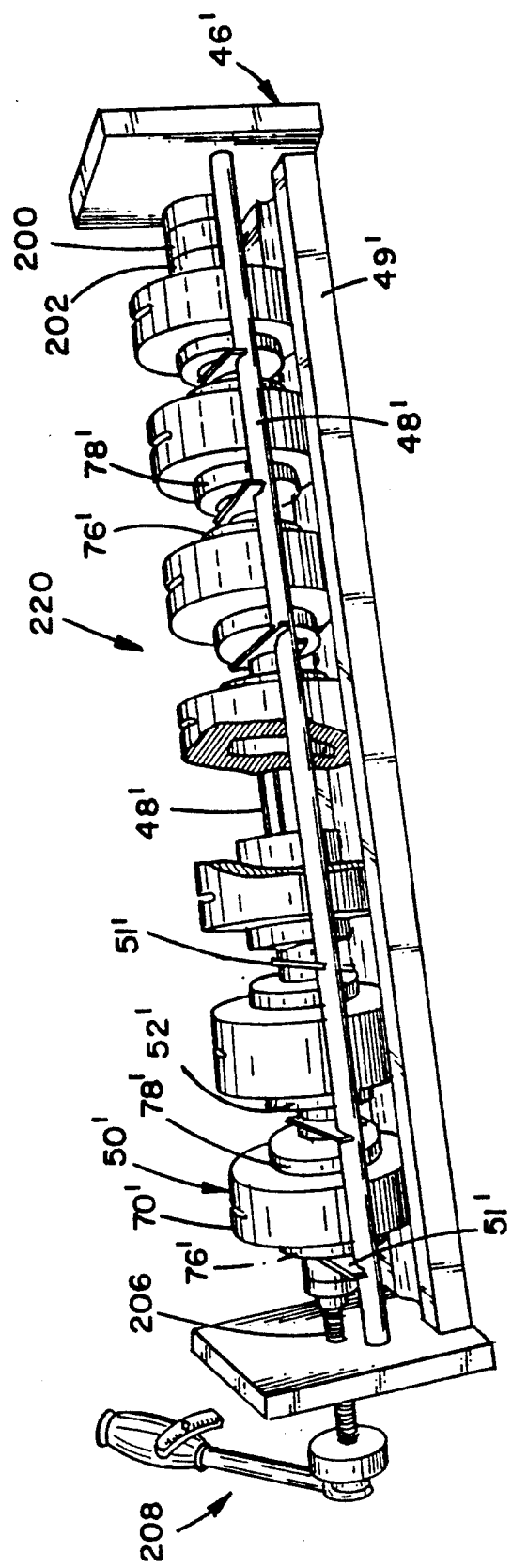
FIG. 10 is a perspective view of a fixture for stack casting a number of lenses and using mechanically adjustable pressure means.

FIG. 10 shows an alternative slide assembly 220 which can be used in the systems illustrated by FIGS. 1-5 and 9. As above, each slide assembly 220 has an elongated frame 46' extending along a longitudinal axis which is along the path for entry of the assembly 220 into the heating system, as through the door 42 into the oven 40 of FIG. 1. Longitudinal rods 48' are disposed parallel to the longitudinal axis of the frame 46', on each side of the center. Individual casting mold units 50' of generally cylindrical form are seated on a longitudinal groove along a support base 49' on the frame 46', and alternated with individual slide separators 51' that are suspended on the rods 48'. Each of the separators has an approximately centrally disposed spacer ring 52' which protrudes in the opposite directions along the central axis from the separator 51' so as to engage aligned glass or metal mold units 50'. The mold units 50' comprise a retainer ring 70, and glass or metal male and female molds 76', 78' on opposite sides that seat in the ring 70'.

A 40 to 80 shore hardness silicone pad 200 is located at one end of the slide assembly 220. The silicone pad 200 acts as a compressible support, maintaining the mold units 50' in an upright position. A large spacer 202 is located between the silicone pad 200 and one end of the stacked individual mold units 50'. It has been found to be advantageous to use a silicone pad 200 in the slide assembly 220 since it has a high thermal coefficient of expansion when the slide assembly 220 is heated for the cure cycle, thereby exerting further pressure on the mold units 50'. The silicone pad 200 replaces a spring that may alternatively be used at the end of the slide assembly 220.

The mold units 50' are held in place under adjustable pressure by a lead screw 206 seated in the frame 46' at the opposite end from the silicone pad 200. One end of the lead screw 206 pushes against the first stacked mold unit 50'. A handle (not shown) or torque wrench 208 is coupled to the protruding end of the lead screw and is used to increase pressure at intervals on the stack of individual mold units 50' during the cure cycle. It has been found to be advantageous to use a torque wrench 208 to apply variable force and pressure because the amount of pressure applied to the mold units 50' can be simply and directly adjusted and controlled. The lead screw 206 is tightened against the mold units 50' in 20 to 30 minute intervals during the single stage cure cycle so that the molds 76', 78' remain tight against the polymer system. A torque of approximately twenty (20) inch-pounds (in-lbs), which is equivalent to about 12.5 psi in this structure, is maintained against the mold units 50' under ambient temperature after the approximately 40–45 minute gelation period, i.e., after the firm gel stage of the composition is reached. At this point, the slide assembly 220 is placed in the oven for the single cure cycle at 175° F.–185° F., and the pressure is incrementally increased using the torque wrench 208, as described above. When the slide assembly 220 is being heated, as in an oven, brief access is sufficient for the torque wrench 208 to be adjusted manually to increase the pressure on the mold units 50'. Manual adjustment, as with a torque wrench, has been found to provide a better matching of the casting to the mold, which eliminates wrinkles on the edges of the lens castings. Since pressure is adjusted regularly and frequently to the mold units 50', the rate of shrinkage of the casting is compensated for and the mold is in excellent contact with the casting.

The following specific Examples can be used to further illustrate the invention.

EXAMPLE 1

A polyester resin system, having a molecular weight of 1500–5200, a specific gravity of 1.12, at 25° C., a viscosity of 440 c.p.s. at 25° C., and a refractive index in liquid form of 1.5412 is used that contains 18% flexible polyester and 28% to 40% (37% in this example) styrene, by weight. The base polyester in this example was "S-40" of Silmar Division and the flexible resin was "D 658", also of Silmar Division. With 100 parts by weight of this composition was combined 10 parts by weight of phenoxyethyl methacrylate (Sartomer 340, Sartomer Co.), together with 1.25 parts by weight of "CADOX M-50", a methyl ethyl ketone (MEK) peroxide solution supplied under that trademark by Noury Chemical. The mixture was thoroughly mixed at ambient temperature before being cast at ambient pressure into individual optical eyeglass molds having glass mold surfaces and a silicone gasket and disposed in stack configurations. The composition flowed readily and completely filled the molds, which were 76 mm diameter. After filling the molds, the stack of molds was subjected to 2.5 psi of pressure for 12 minutes, during the period of initial gelation at room temperature. After the castings reached a state of surface hardness and non-tackiness, the temperature was raised to 140° F. by placing the molds in a furnace. The pressure was increased to about 5.8 psi against the mold face of about 3 inch diameter, which pressure was maintained until completion of the cycle at about 90 minutes. The cast part was then allowed to cool and the mold was separated, with the part releasing from the mold faces solely upon a light impact. It was post cured at 180° F. for about 4 hours to insure that high and uniform hardness was obtained by complete polymerization.

Upon inspection, the semi-finished optical lens blank thus provided had a precisely formed convex surface, a brilliant, water-white clarity, and was free of bubbles and striations. It had an index of refraction of 1.56, and a specific gravity of 1.19. It was then submitted to an optical prescription laboratory specializing in contouring and finishing eyeglass lenses, where it was found that the response to abrading factors was such that the normal five-step contouring, grinding and polishing process could be reduced to a single contouring step and no more than two grinding/polishing steps. Further, the ground and polished lens product of 2 mm thickness withstood the standard 4 foot drop ball test, using a standard ⅝" diameter steel ball. The impact resistance was also sufficient to withstand a 6 foot drop test.

Upon repeated running of the sequence of Example 1, it was noted that the same results were consistently observed, and that the process sequence was essentially very stable, inasmuch as yields of satisfactory semi-finished eyeglass blanks were well in excess of 90%. Both commercially available and experimental coatings were applied for abrasion resistance. Such coating readily adhered, whether applied by dipping, spraying or spin coating. Surface tints were also applied without difficulty.

EXAMPLE 2

The full procedure of Example 1 was followed using 89% of a base polyester resin "A" of Ashland. This base polyester incorporates 28% by weight of styrene but no flexibilizer as such while having adequate durability and toughness. The resultant product again had a refractive index of 1.56, optical clarity, more than adequate impact strength, and comparable process stability.

EXAMPLE 3

Using the constituents and processing steps of Examples 1 and 2 above, but varying only the proportion of phenoxyethyl methacrylate, it was observed that: An optimum condition of optical brilliance, high impact resistance, high index of refraction and freedom from optical imperfections was obtained with 10% acrylic by weight.

EXAMPLE 4

Increasing the cure temperature after gelling takes place reduces the length of the cure cycle. However, because of the exotherm generated during a single stage cure, there are possible difficulties with excessive temperature levels being generated, creating undesirable fracturing effects. This is particularly true where the thickness of the part, in one or more regions, is substantial. Thus, particularly for semi-finished lens blanks and prescription lenses, using the procedure as set forth in Example 1 it was found that an optimum stable condition was to cure at 130° F. to 140° F. with about 1.25 parts by weight catalyst for corrections of 0.5, 2.25, 4.25, and 6.25 diopters, and that:

A. At 120° F., the cure time required several hours total or longer.

B. Conditions of 130° F. and 120 minutes cure time were better suited for more radical curvatures (eg 8.25 to 10.25 diopters).

C. At 150° F., there was a tendency toward occasional yellowness and an inhibition of curing, particularly in regions close to the gaskets or retainers striations occasionally appeared in the cast part along with problems in separating from the mold. An extreme exothermic reaction seeks to draw the center of a cast lens away from the mold, but the cast surface tends to adhere to the mold, and this can result in cracking.

D. Curing optical lens blanks at 165° F. and above typically results in striations in the lenses, inhibition of curing, yellowness and other unsatisfactory optical properties.

EXAMPLE 5

Using the components and processing steps of Example 1 with Silmar "S-40", but varying the styrene content, it was observed that 28%–30% styrene was superior to the typical 37% content for combined optical and physical values, in that:

A. At below about 28% styrene, the vehicle became increasingly viscous, would not cast properly, entrapped air bubbles and required too much heat to cast.

B. Above about 30% styrene, the physical properties, particularly notch sensitivity, declined gradually. With excess of 40% styrene, the resultant product tended to be too brittle to pass the impact resistance tests.

EXAMPLE 6

Tests were also run with the Silmar "S-40" using the procedure of Example 1 to determine the extent of variability of the flexible polyester relative to the other components, in relation to the 18% optimum range. It was found that:

A. At below 15% flexible polyester, the product would have inadequate impact resistance to survive the drop test.

B. At 20% flexible resin and above, the products might be capable of surpassing the drop test but would lose significant hardness and lens fabricating properties.

EXAMPLE 7

Other catalysts in addition to the MEK peroxide catalyst have been used with comparable effects. Different runs were made using from 0.5 weight percent to 2.0 weight percent MEK peroxide catalyst using the procedure of Example 1, to provide gel times from 16 minutes down to 4 minutes at 77° F. (25° C.). For control and consistency, 1.25 parts by weight catalyst was found to be preferred. In testing the optimum mixture of Example 1 under the same processing steps, using different amounts of catalyst, it was found that:

A. While 0.5 parts by weight catalyst could be used, it substantially lengthened the gel and cure times. However, using this percentage of catalyst enables heating the casting during the cure cycle to a higher level without as much danger from exotherm damage.

B. 1.0 part by weight catalyst required somewhat longer gel time than the optimum and made the process partially dependent upon the ambient temperature level.

C. 2.0 parts by weight catalyst made the processing steps overly sensitive and unreliable, and began to introduce optical defects in the product. Also, this level tended to increase the effects of cure inhibition from gasket materials.

EXAMPLE 8

The base polyester vehicle of Example 1 (Silmar "S-40") was used in conjunction with 5 parts by weight of phenoxyethyl methacrylate and 5 parts by weight of methyl methacrylate, premixed with 1 part by weight of catalyst. When cast using the same processing steps as Example 1, the resultant semi-finished blank has a Barcol hardness of 50 and passed the drop test at the required 4' level. Varying these conditions somewhat, it was found that:

A. The use of 10 parts by weight of phenoxyethyl methacrylate enabled the Barcol hardness to be increased to 52, but the product failed the drop test.

B. Using 5 parts by weight of methyl methacrylate but no phenoxymethacrylate, the Barcol hardness increased to 52 but the drop test was failed.

C. Increasing the phenoxymethacrylate to 7 parts by weight while maintaining the methyl methacrylate at 6 parts by weight, the Barcol hardness dropped to 48 and the drop test was satisfactorily met at 4'.

EXAMPLE 9

The base polyester vehicle of Example 1 (Silmar "S-40") was mixed with an additional 5 parts by weight (per 100 of polyester vehicle) of flexible polyester (Silmar D658), 7 parts by weight of phenoxyethyl methacrylate by weight, (Sartomer 340, Sartomer Co.), 3 parts by weight of methyl methacrylate and 1 part catalyst and processed in accordance with Example 1. This product provided an index of refraction of 1.56, and Barcol hardness of 48, and passed the drop test at both 4' and 6'. In using the same added amount of flexible polyester, the following results were observed:

A. With 6 parts by weight of phenoxyethyl methacrylate and 5 parts by weight of methyl methacrylate the Barcol hardness was reduced to 44 and the drop test 4' was failed.

B. Using 4 parts by weight of phenoxyethyl methacrylate and 5 parts by weight of methyl methacrylate the drop test was passed at 4' and the Barcol hardness was 47, but the drop test was failed at 6'.

If the methyl methacrylate is premixed with about 1 part by weight of catalyst and stored for use it has no dangerous properties but haziness begins to appear in the optical product after about a week of mixture. In order to keep the acrylic longer while avoiding this condition, it need only be refrigerated in the range of 40° F. The polyester/acrylic system has a UV blocking characteristic of approximately 65%, which is superior to "CR39". However, by adding one-tenth percent to one-fourth percent of tin octuate the UV blockage characteristic can be increased to approximately 100% if desired. The amount of UV blocker that need be added is below the level at which a yellowing tendency occurs.

EXAMPLE 10

A polyester resin system, having a molecular weight of 1500–5200, a specific gravity of 1.12, at 25° C., a viscosity of 440 c.p.s. at 25° C., and a refractive index in liquid form of 1.5412 is used that contains about 35 percent (35%) styrene by weight. The base polyester in this example was "S-40" of Silmar Division. 100 parts by weight of this S-40 compound was combined with 10 parts by weight of phenoxyethyl methacrylate (Sartomer 340, Sartomer Co.) together with 1.0 part by weight of "CADOX M-50", a methyl ethyl ketone peroxide solution supplied under that trademark by Noury Chemical. The mixture was thoroughly mixed at ambient temperatures (75° F., maintained within ±7° F.) before being cast at ambient pressure into individual optical eyeglass molds having glass mold surfaces and a silicone gasket and disposed in stack configurations. The surfaces of the glass molds were precoated with an abrasion-resistant UV curable coating (Perma Clear, Sherwin Williams Co.) and were exposed to UV radiation for 2 seconds. The composition flowed readily and completely filled the molds, which were 76 mm in diameter. After filling the molds, the stack of molds were pressurized at 2.5 psi for 15 minutes while at room temperature, during the period of initial gelation. After the castings reached a state of surface hardness and non-tackiness, the molds were placed in an oven maintained at about 117° F. temperature but at least within the 110° F. to 120° F. range. The pressure was increased to about 5 psi against the mold face of about 3 inch diameter, which pressure was maintained until completion of the first stage of the cure cycle in about 30 minutes. The compressive forces were released, and the molds were placed in a second oven maintained at a temperature of 180° F. to 190° F., nominally 180° F. The pressure was increased to about 10 psi against the mold face of about 3 inch diameter, and the pressure was maintained until completion of the second stage of the cure cycle in about one hour. The pressure forces were relieved again, and the cast part was then allowed to cool and the mold was separated, with the part releasing from the mold faces solely upon a light impact. The coating on the lenses was then subjected to two exposures of UV radiation for about one minute each time to fully cure the coating.

Upon inspection, the semi-finished optical lens blank thus provided had a precisely formed convex surface, a brilliant, water-white clarity, and was free of bubbles and striations. It had an index of refraction of 1.565 and a specific gravity of 1.19. It was then submitted to an optical prescription laboratory specializing in contouring and finishing eyeglass lenses, where it was found that the response to abrading factors was such that the normal five-step contouring, grinding and polishing process could be reduced to a single contouring step and no more than two grinding/polishing steps. Further, the ground and polished lens product of 2 mm thickness withstood the standard 4 foot drop ball test, using a standard $\frac{5}{8}$" diameter steel ball. The impact resistance was also sufficient to withstand a 6 foot drop test.

Upon repeated running of the sequence of Example 1, it was noted that the same results were consistently observed, and that the process sequence was essentially very stable, providing high yields of lens blanks.

EXAMPLE 11

The procedure of Example 10 was followed, except that the molds were placed horizontally in a single layer on a rigid plastic sheet located near the bottom of a water bath tank, rather than in an oven. The water is maintained at a temperature of 115° F. The pressure was increased to 5 psi against the mold face of about 3 inch diameter and the pressure was maintained for 30 minutes through the completion of the first stage of the cure cycle. The pressure forces were released, and the mold units were placed in a second water tank which was kept at a temperature of 180° F. Racks containing the mold units were placed on end, vertically onto a rigid plastic sheet located near the bottom of the water bath tank. The water level completely covered the racks containing the mold units. Pressure was increased to 10 psi against the mold face of about 3 inch diameter and was maintained for one hour until the completion of the second stage of the cure cycle. The cast part was then allowed to cool. The mold was separated, with the part releasing from the mold faces solely upon a light impact. The coating on the lenses was exposed to UV radiation, as described in Example 10.

Upon inspection, the semi-finished optical lens blank thus provided a precisely formed convex surface, a brilliant, water-white clarity, and was free of bubbles and striations. It had an index of refraction of 1.56, and a specific gravity of 1.19. It was then submitted to an optical prescription laboratory specializing in contouring and finishing eyeglass lenses, where it was found that the response to abrading factors was such that the normal five-step contouring, grinding and polishing process could be reduced to a single contouring step and no more than two grinding/polishing steps. Further, the ground and polished lens products of 2 mm thickness withstood the standard 4 foot drop ball test, using a standard $\frac{5}{8}$" diameter steel ball. The impact resistance was also sufficient to withstand a 6 foot drop.

Upon repeated running of sequence of Example 1, it was noted that the same results were consistently observed, and that the process sequence was stable in terms of providing lenses free of defects with high yields.

EXAMPLE 12

Increasing the cure temperature after gelling takes place reduces the length of the cure cycle. However, because of the exotherm generated during the cure, there are possible difficulties with excessive temperature levels being generated, creating undesirable fracturing effects. This is particularly true where the thickness of the part, in one or more regions, is substantial. Thus, particularly for semi-finished lens blanks and prescriptions lenses, it was found that stable conditions were maintained by curing at 110° F. to 120° F. for 30 minutes and then at 180° F. to 190° F. with about 1.0 part by weight catalyst for corrections of 0.5, 2.25, 4.25, 6.25, 8.25, 10.25, and 12.25 diopters.

EXAMPLE 13

Other catalysts in addition to the MEK peroxide catalyst have been used with comparable effects. Different runs were made using from 0.5 weight percent to 2.0 part by weight MEK peroxide catalyst following the procedure of Example 10, to provide gel times from 16 minutes down to 4 minutes at 77° F. (25° C.). For control and consistency, 1.0 part by weight catalyst was found to be preferred when following the procedures of Examples 10 and 11. In testing the optimum mixture of Examples 10 and 11 under the same processing steps, using different amounts of catalyst, it was found that:

A. While 0.5 parts by weight catalyst could be used, it substantially lengthened the gel and cure times. However, using this percentage of catalyst enables heating the casting during the cure cycle to a higher level without as much danger from exotherm damage.

B. 1.25 parts by weight catalyst made the processing steps overly sensitive and unreliable, and began to introduce optical defects in the product.

C. 2.0 parts by weight catalyst made the processing steps overly sensitive and unreliable, and began to introduce optical defects in the product. Also, this level tended to increase the effects of cure inhibition from gasket materials.

EXAMPLE 14

The surfaces of the individual glass molds were first pre-coated with an abrasion resistant coating. The concave mold was placed on a spinning holder with the mold face up under a hood with deionized air permeating through out. Approximately 5 milliliters (ml) of isopropanol was placed in the mold surface to clean the surface, starting at the center and moving to the edge of the mold, while the mold was spun for approximately 15 seconds, or until all of the solvent had spun off and evaporated. Approximately 2.5 ml of a ultraviolet (UV) curable coating (150 B, Lens Technology) was applied to the mold so as to cover the entire face of the mold. The mold containing the coating was then spun for 45 seconds. The coated mold surface was inspected for cleanliness and coating coverage, placed on a conveyor belt, and then exposed to UV radiation in a UV curing machine for approximately 6 seconds, so that complete polymerization of the UV curable coating results. The coated mold was passed under a stream of deionized air for 2 seconds.

A polyester resin system, having a molecular weight of 1500–5200, a specific gravity of 1.12, at 25° C., a viscosity of 440 c.p.s. at 25° C., and a refractive index in liquid form of 1.5412 is used that contains 18% flexible polyester and 35% styrene, by weight. The base polyester in this example was "S-40" of Silmar Division, and the flexible resin was "D658", also from Silmar Division. With 100 parts by weight of this composition was combined 10 parts by weight of phenoxyethyl methacrylate ("Sartomer 340" from the Sartomer Co.), together with 1.0 part by weight of "CADOX M-50", a methyl ethyl ketone (MEK) peroxide solution supplied under that trademark by Noury Chemical, and 0.2 of one percent of Tinuvin 327, a UV blocker from Ciba Geigy. The mixture was thoroughly mixed at ambient temperature before being cast at ambient pressure into individual optical eyeglass molds having glass mold surfaces and a silicone gasket and disposed in stack configurations. The composition flowed readily and completely filled the molds, which were 76 mm in diameter.

After filling the molds, the composition was allowed to gel at ambient temperature. The stack of molds remained at ambient (room) temperature (75° F.±8° F.) for 45 minutes with about 2.5 psi of pressure being applied right after the composition was poured into the molds by hand tightening the lead screw against the molds. After the 45 minutes, a lead screw operated by a torque wrench was used to apply 12.5 psi of pressure against the mold face of 3 inch diameter.

The stack of molds was then placed in an oven at a temperature of 180° F. for a two (2) hour cure cycle. The torque wrench was used to increase the pressure against the mold face of 3 inch diameter during the two hour cure cycle such that 12.5 psi of pressure was applied against the mold face of about 3 inch diameter before the molds were placed in the oven for the first twenty minutes of the two hour 180° F. cure cycle, as described above, 15.8 psi of pressure was applied for the next thirty (30) minutes, 21.6 psi for the next successive thirty (30) minute period, and then 25.8 psi for 40 minutes. The torque wrench inserted through the opened oven door was used to manually tighten the lead screw once against the mold units after every 20 to 30 minute interval so that the lead screw was held tightly against the mold units.

The cast part was then allowed to cool and the mold was separated under de-ionized air, with the part releasing from the mold faces when an air hammer was used. No post curing of the lens was done.

Upon inspection, the semi-finished optical lens blank thus provided had a precisely formed convex surface, a brilliant, water-white clarity, and was free of bubbles and striations. It had an index of refraction of 1.56, and a specific gravity of 1.19. It was then submitted to an optical prescription laboratory specializing in contouring and finishing eyeglass lenses, where it was found that the response to abrading factors was such that the normal five-step contouring, grinding and polishing process could be reduced to a single contouring step and no more than two grinding/polishing steps. Further, the ground and polished lens product of 2 mm thickness withstood the standard 4 foot drop ball test, using a standard ⅝" diameter steel ball. The impact resistance was also sufficient to withstand a 6 foot drop test.

Upon repeated running of the sequence of Example 14, it was noted that the same results were consistently observed, and that the process sequence was essentially very stable, inasmuch as yields of satisfactory semi-finished eyeglass blanks were very high. It was found that bubbles in the resin composition could be eliminated by careful attention to the mix, by a bottom mixing system, or by using a vacuum. Surface tints were also applied without difficulty.

Discussion

From these results, it is apparent that the high viscosity polyester vehicle flows uniformly into the mold because the phenoxyethyl methacrylate aids the styrene in lowering viscosity. The acrylic ester monomer cross links with the polyester system, imparting unexpected levels of strength and hardness. Moreover, the casting process is stable under a range of conditions to give high yields. Such results, in terms of freedom from adherence to the mold, freedom from bubbles and striations, and repeatability of the process were not to be anticipated as the result of extensive prior work on polyester systems. It is also thought that the cured polymeric product is unique in finishing and polishing responses because it is hard but not brittle in character. Thus, when abraded by a contouring or polishing element, minute particulates are separated that have little tendency toward cohesion and adherence. This perhaps explains why a prescription surface can be formed and finished in fewer steps than heretofore required. As a further example, if a sample is subjected to an extreme drop test, far beyond normal requirements, it is sometimes observed that the steel ball passes directly through, leaving an essentially round hole without cracking the associated structure. Consequently, the basic toughness, strength and low rate of notch sensitivity are present but the material simply shears when a given stress level is exceeded.

Although there have been described in the examples above and illustrated in the drawings various forms and modifications in accordance with the invention it will be appreciated that the invention is not limited thereto but includes all variations and expedients within the scope of the appended claims.

What is claimed is:

1. A curable composition comprising:
    (a) about 80–95 parts by weight of an unsaturated polyester resin;
    (b) about 6 to 12 parts by weight of phenoxyethyl acrylate; and
    (c) about 0.5 to 2 parts by weight of a free radical catalyst.

2. The composition of claim 1 wherein the unsaturated polyester is formed from the interaction of an unsaturated α, β-dicarboxylic acid or anhydride and a glycol.

3. The composition of claim 2 wherein the unsaturated polyester resin contains about 26 to 40 wt-% of styrene.

4. The composition of claim 3 wherein the unsaturated polyester resin comprises about 5% to 20% of a flexible polyester.

5. The composition of claim 1 further comprising 3 to 6 parts by weight of methyl methacrylate.

6. The composition of claim 1 wherein after curing the composition has an index of refraction of about 1.56 or greater.

7. A molded ophthalmic lens which comprises a cured plastic formed from a composition comprised of:
(a) about 80–95 parts by weight of an unsaturated polyester resin;
(b) about 6 to 12 parts by weight of a phenoxyethyl acrylate or methacrylate; and
(c) about 0.5 to 2 parts by weight of a free radical catalyst.

8. The lens of claim 7 wherein the unsaturated polyester resin contains about 28 to 38 wt-% of styrene and about 5% to 20% of a flexible polyester.

9. The lens of claim 7 wherein the ethylenically unsaturated aromatic ester comprises phenoxyethyl methacrylate and the lens has an index of refraction of at least 1.56.

10. A molded ophthalmic lens which comprises a cured plastic formed from a composition comprised of:
(a) about 80–95 parts by weight of an unsaturated polyester resin:
(b) about 6–12 parts by weight of an ethylenically unsaturated aromatic ester comprises a monomer of the formula:

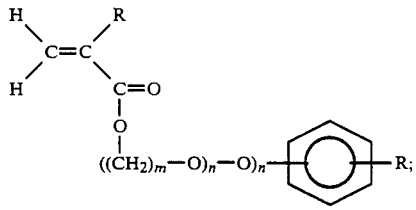

(c) about 0.5 to 2.0 parts by weight of a free radical catalyst.

wherein each R is independently hydrogen or a $C_{1-12}$ alkyl; m is an integer of 1 to 6; and n is an integer of 1 to 12; and 11. The lens of claim 10 wherein the ethylenically unsaturated aromatic ester comprises a monomer of the formula:

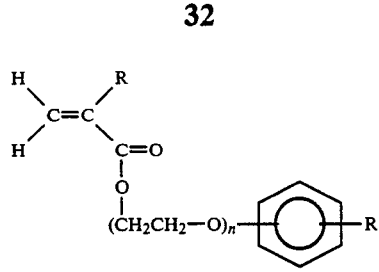

wherein R comprises a $C_{1-4}$ alkyl and n is an integer of 1 to 8.

12. A cast product comprising a cured plastic formed from a composition comprising:
(a) about 84–92 parts by weight of polyester containing less than 40% styrene; and
(b) about 6 to 12 parts by weight of phenoxyethyl acrylic ester;
wherein the product has a Barcol hardness in excess of 47, and an index of refraction of about 1.56 or greater.

13. The product of claim 12, wherein the phenoxyethyl acrylic ester is present in an amount of from about 10 parts by weight, and wherein the Barcol hardness is about 48–50 and the specific gravity is about 1.19.

14. A molded opthalmic lens which comprises a cured plastic formed from a composition comprised of:
(a) about 80–95 parts by weight of an unsaturated polyester which includes about 28 to 38 wt-% of styrene;
(b) about 6 to 12 parts by weight of phenoxyethyl acrylate or methacrylate; and
(c) about 0.5 to 2 parts by weight of a free radical catalyst;
and the lens having an index of refraction of about 1.56 or greater.

15. The lens of claim 14 wherein the unsaturated polyester resin comprises about 5 to 20% of a flexible polyester and the lens has a Barcol hardness of at least 46 and withstands a drop ball impact test.

16. The lens of claim 14 comprising about 10 parts by weight of phenoxyethyl methacrylate.

17. A curable composition comprising:
(a) about 89 parts by weight of an unsaturated polyester resin;
(b) about 10 parts by weight of phenoxyethyl acrylate; and
(c) about 1.0 part by weight of a free radical catalyst.

18. The composition of claim 17 wherein the unsaturated polyester is formed from the interaction of an unsaturated α, β-dicarboxylic acid or anhydride and a glycol.

19. The composition of claim 18 wherein the unsaturated polyester resin comprises about 28 wt-% sytrene and about 18% of a flexible polyester, and which further comprises 0.2 of one percent (1%) of an ultraviolet (UV) blocker.

20. The composition of claim 19 wherein the UV blocker comprises tin octoate.

* * * * *